(12) United States Patent
Shirata et al.

(10) Patent No.: US 11,100,949 B2
(45) Date of Patent: Aug. 24, 2021

(54) MAGNETIC RECORDING MEDIUM

(71) Applicant: FUJIFILM Corporation, Tokyo (JP)

(72) Inventors: Masashi Shirata, Kanagawa (JP); Takashi Fujimoto, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 560 days.

(21) Appl. No.: 15/996,622

(22) Filed: Jun. 4, 2018

(65) Prior Publication Data

US 2018/0358046 A1 Dec. 13, 2018

(30) Foreign Application Priority Data

Jun. 9, 2017 (JP) .............................. JP2017-114785

(51) Int. Cl.
| | |
|---|---|
| *G11B 5/78* | (2006.01) |
| *G11B 5/714* | (2006.01) |
| *G11B 5/706* | (2006.01) |
| *G11B 5/708* | (2006.01) |

(52) U.S. Cl.
CPC .............. *G11B 5/78* (2013.01); *G11B 5/7085* (2013.01); *G11B 5/70621* (2013.01); *G11B 5/70642* (2013.01); *G11B 5/714* (2013.01)

(58) Field of Classification Search
CPC ... G11B 5/78; G11B 5/70621; G11B 5/70642; G11B 5/7085; G11B 5/714; G11B 5/08
See application file for complete search history.

(56) References Cited

U.S. PATENT DOCUMENTS

| | | | |
|---|---|---|---|
| 6,312,796 B1 | 11/2001 | Zinbo | |
| 9,401,171 B2 * | 7/2016 | Kasada | G11B 5/7013 |
| 9,530,444 B2 * | 12/2016 | Kasada | G11B 5/70678 |
| 2004/0241498 A1 * | 12/2004 | Zinbo | G11B 5/735 |
| | | | 428/844.3 |
| 2014/0212693 A1 | 7/2014 | Hattori | |
| 2017/0162220 A1 | 6/2017 | Nakashio et al. | |
| 2017/0221513 A1 * | 8/2017 | Hiroi | G11B 5/70642 |
| 2018/0366151 A1 | 12/2018 | Ohkoshi et al. | |

FOREIGN PATENT DOCUMENTS

| | | |
|---|---|---|
| JP | 2000-149243 A | 5/2000 |
| JP | 2004-281025 A | 10/2004 |
| JP | 2013-229090 A | 11/2013 |
| JP | 2014-149886 A | 8/2014 |
| JP | 2014-179149 A | 9/2014 |
| JP | 2017-041293 A | 2/2017 |
| WO | 2015/198514 A1 | 12/2015 |
| WO | 2017/094752 A1 | 6/2017 |

OTHER PUBLICATIONS

Notice of Reasons for Refusal dated Jan. 21, 2020, issued by the Japanese Patent Office in Application No. 2017-114785.

* cited by examiner

*Primary Examiner* — Holly Rickman
(74) *Attorney, Agent, or Firm* — Sughrue Mion, PLLC

(57) ABSTRACT

Provided is a magnetic recording medium including: a non-magnetic support; and a magnetic layer including particles of at least one kind of epsilon type iron oxide-based compound selected from the group consisting of $\varepsilon\text{-Fe}_2\text{O}_3$ and a compound represented by Formula (1), an abrasive, and a binding agent, at least on one surface of the non-magnetic support, in which an average equivalent circle diameter of the particles of the epsilon type iron oxide-based compound is 7 nm to 18 nm, an average equivalent circle diameter of the abrasive in a plan view of the magnetic layer is 20 nm to 1,000 nm, and a coefficient of variation of the equivalent circle diameter of the abrasive is 30% to 60%. In Formula (1), A represents at least one kind of metal element other than Fe and a satisfies a relationship of 0<a<2.

$$\varepsilon\text{-A}_a\text{Fe}_{2-a}\text{O}_3 \quad (1).$$

6 Claims, No Drawings

MAGNETIC RECORDING MEDIUM

CROSS-REFERENCE TO RELATED APPLICATIONS

This application claims priority under 35 USC 119 from Japanese Patent Application No. 2017-114785 filed on Jun. 9, 2017, the disclosure of which is incorporated by reference herein in its entirety.

BACKGROUND OF THE INVENTION

1. Field of the Invention

The present invention relates to a magnetic recording medium.

2. Description of the Related Art

As a magnetic recording medium such as a magnetic tape, a coating type magnetic recording medium obtained by applying a magnetic layer in which ferromagnetic powder is dispersed in a binding agent (so-called binder), onto a non-magnetic support is widely used from viewpoints of productivity and universal use. In such a coating type magnetic recording medium, for example, an abrasive such as alumina is added or a solid lubricant such as carbon black or a liquid lubricant such as fatty acid ester is normally added to a magnetic layer, in order to reduce tape damage such as wear or scratches which may occur during running.

For example, a magnetic recording medium including: a magnetic layer including ferromagnetic powder and a binding agent on a non-magnetic support, in which the ferromagnetic powder is ferromagnetic hexagonal ferrite powder including 3% by mass to 12% by mass of Al with respect to 100% by mass of a total amount, in terms of $Al_2O_3$, the magnetic layer further includes an abrasive, a plan view maximum area of the abrasive confirmed in a region having a size of 4.3 μm×6.3 μm of the magnetic layer obtained with a scanning electron microscope is smaller than 0.06% with respect to 100% of a total area of the region, is known (for example, see JP2014-179149A).

In addition, a magnetic recording medium including: a non-magnetic layer including non-magnetic powder and a binding agent; and a magnetic layer including ferromagnetic powder and a binding agent on a non-magnetic support, in this order, in which the non-magnetic layer has a thickness equal to or smaller than 300 nm, a composite modulus of elasticity measured regarding a surface of the magnetic layer is 6.0 GPa to 8.0 GPa, the magnetic layer includes an abrasive having a specific surface area of 14 $m^2/g$ to 40 $m^2/g$ which is obtained by a BET method, and a percentage of the abrasive occupying the surface of the magnetic layer is 0.2% to 2% m is known (for example, see JP2013-229090A).

Further, a magnetic tape including: a non-magnetic support; a magnetic tape main body that includes magnetic layers laminated and formed on one surface of the support; and a magnetic layer side lubricant layer that is formed on the surface of the magnetic tape main body on a side where the magnetic layer is formed, in which the lubricant layer includes an ultraviolet curable type silicone resin and silicone oil, is known (for example, see JP2017-041293A).

SUMMARY OF THE INVENTION

As described above, an abrasive is one of components which can contribute to improvement of durability of a coating type magnetic recording medium. However, phenomena of a decrease in durability of a magnetic layer due to wear, scratches, and the like of a head and a decrease in a Signal to Noise Ratio (SNR) due to an increase in noise may occur due to the abrasive.

Normally, particles of the abrasive are present in a magnetic layer in an aggregated manner. In a case where a degree of aggregation of particles of the abrasive present in the magnetic layer is great, a signal intensity greatly decreases due to a local decrease in squareness ratio (SQ), and accordingly, a high SNR cannot be realized. In a case where a degree of aggregation of particles of the abrasive present in the magnetic layer is excessively small, debris (for example, waste of head) is accumulated due to a weakened abrasion force, and accordingly, a high SNR is difficult to realize as initial properties. Further improvement of electromagnetic conversion characteristics is required for the magnetic recording medium, and thus, it is desired to avoid a decrease in SNR due to the abrasive as much as possible.

In regards to this point, excellent electromagnetic conversion characteristics, durability, and the like are realized by using ferromagnetic hexagonal ferrite powder including Al as ferromagnetic powder and causing an abrasive to be present in a magnetic layer in a state of particles finer than those used in the related art, in the magnetic recording medium disclosed in JP2014-179149A, and by causing fine particles of an abrasive to be suitably present on a surface of a magnetic layer, in the magnetic recording medium disclosed in JP2013-229090A.

However, in recent years, a crystal structure of $\varepsilon\text{-}Fe_2O_3$ (epsilon iron oxide) realizing extremely great coercivity while being nanosize particles is attracting attention as a magnetic material, along with realization of high performance of a magnetic recording medium.

The inventors have conducted various research studies in order to use a crystal structure of $\varepsilon\text{-}Fe_2O_3$ in a magnetic recording medium, and found that, in a case where the crystal structure of $\varepsilon\text{-}Fe_2O_3$ is included in a magnetic layer, an effect of aggregation of particles of an abrasive used in combination is easily received and a decrease in signal intensity due to a local decrease in SQ tends to become significant, due to a small number of upward spins (that is, low σs).

In addition, since the crystal structure of $\varepsilon\text{-}Fe_2O_3$ is extremely fine particles, properties of a film of a magnetic layer including the crystal structure of $\varepsilon\text{-}Fe_2O_3$ tend to be extremely poor. Accordingly, in a case of using an abrasive in combination, it is necessary to expose a certain amount of the abrasive to the surface of the magnetic layer, in order to prevent a coating film fracture. However, it is also found that, in a case where the amount of the abrasive exposed to the surface of the magnetic layer is great, a decrease in SNR may occur.

In addition, according to the studies of the inventors, it is determined that durability of the magnetic layer including the crystal structure of $\varepsilon\text{-}Fe_2O_3$ cannot be improved by only solving an aggregation state of particles of the abrasive and causing the abrasive to be present in a state of fine particles, as disclosed in JP2014-179149A, for example, and a decrease in SNR of a magnetic recording medium using the crystal structure of $\varepsilon\text{-}Fe_2O_3$ cannot be prevented by only optimizing the amount of abrasive present on the surface of the magnetic layer, as disclosed in JP2013-229090A, for example.

An object of one embodiment of the invention is to provide a magnetic recording medium including particles of an epsilon type iron oxide-based compound as a magnetic material, having an excellent SNR, and including a magnetic layer having excellent scratch resistance.

Means for achieving the aforementioned object include the following aspects.

<1> A magnetic recording medium comprising: a non-magnetic support; and a magnetic layer including particles of at least one kind of epsilon type iron oxide-based compound selected from the group consisting of $\varepsilon\text{-}Fe_2O_3$ and a compound represented by Formula (1), an abrasive, and a binding agent, at least on one surface of the non-magnetic support, in which an average equivalent circle diameter of the particles of the epsilon type iron oxide-based compound is 7 nm to 18 nm, an average equivalent circle diameter of the abrasive in a plan view of the magnetic layer is 20 nm to 1,000 nm, and a coefficient of variation of the equivalent circle diameter of the abrasive is 30% to 60%.

$$\varepsilon\text{-}A_aFe_{2-a}O_3 \quad (1)$$

In Formula (1), A represents at least one kind of metal element other than Fe and a satisfies a relationship of 0<a<2.

<2> The magnetic recording medium according to <1>, in which the epsilon type iron oxide-based compound includes the compound represented by Formula (1), and A in Formula (1) is at least one kind of metal element selected from the group consisting of Ga, Al, In, Co, Zn, Ti, and Nb.

<3> The magnetic recording medium according to <1> or <2>, in which a recording system is a linear recording system.

<4> The magnetic recording medium according to <1> or <2>, which is used in electromagnetic wave assist recording.

According to one embodiment of the invention, a magnetic recording medium including particles of an epsilon type iron oxide-based compound as a magnetic material, having an excellent SNR, and including a magnetic layer having excellent scratch resistance is provided.

DESCRIPTION OF THE PREFERRED EMBODIMENTS

Hereinafter, an example of an embodiment of a magnetic recording medium to which the invention is applied will be described. However, the invention is not limited to the following embodiment and can be suitably performed with changes, within a desired range of the invention.

In this disclosure, a numerical value range shown with "to" means a range including numerical values written before and after "to", respectively as the minimum value and the maximum value.

In the numerical value range disclosed in a stepwise manner in this disclosure, an upper limit value or a lower limit value disclosed in a certain numerical value range may be replaced with an upper limit value or a lower limit value of another numerical value range disclosed in a stepwise manner. In addition, in the numerical value range disclosed in this disclosure, an upper limit value or a lower limit value disclosed in a certain numerical value range may be replaced with values shown in examples.

In this disclosure, in a case where a plurality of kinds of substances corresponding to each component are present, the amount of each component means a total amount of the plurality of kinds of substances, unless otherwise noted.

In this disclosure, a term "step" not only means an independent step, but also includes a step, as long as the intended object of the step is achieved, even in a case where the step cannot be clearly distinguished from another step.

Magnetic Recording Medium

A magnetic recording medium of this disclosure includes: a non-magnetic support; and a magnetic layer including particles of at least one kind of epsilon type iron oxide-based compound selected from the group consisting of $\varepsilon\text{-}Fe_2O_3$ and a compound represented by Formula (1), an abrasive, and a binding agent, at least on one surface of the non-magnetic support, in which an average equivalent circle diameter of the particles of the epsilon type iron oxide-based compound is 7 nm to 18 nm, an average equivalent circle diameter of the abrasive in a plan view of the magnetic layer is 20 nm to 1,000 nm, and a coefficient of variation of the equivalent circle diameter of the abrasive is 30% to 60%.

The magnetic recording medium of this disclosure is a magnetic recording medium including particles of an epsilon type iron oxide-based compound as a magnetic material, having an excellent SNR, and including a magnetic layer having excellent scratch resistance.

As described above, the crystal structure of $\varepsilon\text{-}Fe_2O_3$ is attracting attention as a magnetic material, due to realization of extremely great coercivity while being nanosize fine particles.

The inventors have attempted to use the crystal structure of $\varepsilon\text{-}Fe_2O_3$ in a magnetic recording medium, and found that, in a case where the crystal structure of $\varepsilon\text{-}Fe_2O_3$ is included in a magnetic layer, an effect of aggregation of particles of an abrasive used in combination is easily received and a decrease in signal intensity due to a local decrease in SQ tends to become significant, due to a small number of upward spins (that is, low saturation magnetization per unit mass ($\sigma$s)). In a case where a decrease in signal intensity is great, it is difficult to realize a high SNR.

In addition, it is found that, since the crystal structure of $\varepsilon\text{-}Fe_2O_3$ is extremely fine particles, properties of a film of a magnetic layer including the crystal structure of $\varepsilon\text{-}Fe_2O_3$ is extremely poor, a coating film can be fractured, in a case where the amount of the abrasive used in combination exposed to the surface of the magnetic layer is small, and on the other hand, a decrease in SNR may occur, in a case where the amount of the particles of the abrasive exposed to the surface of the magnetic layer is great.

The crystal structure of $\varepsilon\text{-}Fe_2O_3$ is fine particles and has low $\sigma$s. Therefore, in a magnetic recording medium using the crystal structure of $\varepsilon\text{-}Fe_2O_3$, it is difficult to satisfy both an excellent SNR and excellent durability.

With respect to this, in the magnetic recording medium of this disclosure, by controlling an average equivalent circle diameter and a coefficient of variation of the equivalent circle diameter in a plan view of the abrasive in the magnetic layer, the problem regarding the SNR and the durability which may occur in a case of using the crystal structure of $\varepsilon\text{-}Fe_2O_3$ as a magnetic material was solved. More specifically, in this disclosure, an average equivalent circle diameter of the abrasive used in combination in a plan view is set to be 20 nm to 1,000 nm, and a coefficient of variation of the equivalent circle diameter thereof is set to be 30% to 60%, with respect to the particles of the epsilon type iron oxide-based compound having an average equivalent circle diameter of 7 nm to 18 nm. Accordingly, a magnetic recording medium having an excellent SNR and including a magnetic layer having excellent durability (specifically, scratch resistance) can be realized.

Compared to the magnetic recording medium of this disclosure, in the magnetic recording mediums disclosed in JP2014-179149A and JP2013-229090A, the crystal structure of $\varepsilon\text{-}Fe_2O_3$ is not used as a magnetic material. In addition, according to the confirmation of the inventors, it is determined that, in the magnetic recording mediums disclosed in JP2014-179149A and JP2013-229090A, a coefficient of variation of the equivalent circle diameter of the abrasive in the magnetic layer in a plan view is beyond the range of this disclosure.

Therefore, it is thought that a magnetic recording medium having an excellent SNR and including a magnetic layer having excellent scratch resistance cannot be realized, even in a case where a magnetic material of the magnetic recording mediums disclosed in JP2014-179149A and JP2013-229090A is replaced with particles of the epsilon type iron oxide-based compound of this disclosure.

Compared to the magnetic recording medium of this disclosure, in a magnetic tape disclosed in JP2017-041293A, $\varepsilon\text{-}Fe_2O_3$ is included as a magnetic material. However, according to a confirmation test of the inventors, it is determined that both of an average equivalent circle diameter and a coefficient of variation of equivalent circle diameter of the abrasive in the magnetic layer in a plan view are beyond the range of the invention.

Therefore, it is thought that a magnetic recording medium having an excellent SNR and including a magnetic layer having excellent scratch resistance cannot be realized, even in a case where particles of the epsilon type iron oxide-based compound of this disclosure is used as a magnetic material in the magnetic tape disclosed in JP2017-041293A.

Layer Configuration of Magnetic Recording Medium

The magnetic recording medium of this disclosure includes a non-magnetic support as a base material, and a magnetic layer as a magnetic recording layer, and may include other layers according to the purpose.

Examples of the other layers which can be included in the magnetic recording medium of this disclosure include a non-magnetic layer, a back coating layer, and the like.

Non-Magnetic Support

The magnetic recording medium of this disclosure includes a non-magnetic support.

In this disclosure, the "non-magnetic support" means a support satisfying at least one of a residual magnetic flux density equal to or smaller than 10 mT and coercivity equal to or smaller than 7.98 kA/m (100 Oe).

The non-magnetic support can be used without particular limitation, as long as it is a well-known non-magnetic support used in the magnetic recording medium.

A material of the non-magnetic support can be suitably selected among the materials not having magnetism, by considering physical properties such as formability or durability, in accordance with the kinds of magnetic recording medium. As the material of the non-magnetic support, a resin material not including a magnetic material, an inorganic material not having magnetism, and the like can be used.

Examples of the resin material used for forming the non-magnetic support include a resin material such as polyester such as polyethylene terephthalate (PET) or polyethylene naphthalate (PEN), polyolefin such as polyethylene or polypropylene, a polyamide-based resin such as aromatic polyamide including polyamide, polyamide imide, or polyaramide, polyimide, cellulose triacetate (TAC), polycarbonate (PC), polysulfone, and polybenzoxazole.

Among these, as the resin material, at least one kind selected from the group consisting of polyester and a polyamide-based resin is preferable, and at least one kind selected from the group consisting of polyethylene terephthalate, polyethylene naphthalate, and polyamide is more preferable, from viewpoints of excellent strength and durability and ease of processing.

The non-magnetic support is selected according to the usage aspect of the magnetic recording medium.

For example, in a case where the magnetic recording medium is a magnetic tape, a flexible disk, or the like, a resin film (or resin sheet) having flexibility can be used as the non-magnetic support.

In a case of using a resin film as the non-magnetic support, the resin film may be an unstretched film or may be a uniaxially stretched film or a biaxially stretched film. For example, in a case of using a polyester film as the non-magnetic support, a biaxially stretched polyester film may be used from a viewpoint of improving dimensional stability.

The resin film used for the non-magnetic support may have a laminated structure of two or more layers. For example, as disclosed in JP1991-224127A (JP-H03-224127A), a non-magnetic support obtained by laminating a film including two different layers can also be used, in order to change surface roughness of a surface on which a magnetic layer is formed and a surface on which a magnetic layer is not formed.

For example, in order to improve adhesiveness with the magnetic layer to be provided on the surface of the non-magnetic support, surface treatment such as corona discharge, plasma treatment, easy bonding treatment, or heat treatment may be performed with respect to the non-magnetic support in advance, if necessary. In addition, in order to prevent foreign materials from mixing into the magnetic layer, surface treatment such as dust protection treatment may be performed with respect to the non-magnetic support.

These surface treatments can be performed by a well-known method.

Thickness of Non-Magnetic Support

A thickness of the non-magnetic support is not particularly limited and is suitably selected according to the use of the magnetic recording medium.

The thickness of the non-magnetic support is, for example, preferably 2.0 μm to 80.0 μm and more preferably 3.0 μm to 50 μm.

In a case where the magnetic recording medium is a magnetic tape, the thickness of the non-magnetic support is preferably 2.0 μm to 20 μm and more preferably 3.0 μm to 10 μm.

In a case where the thickness of the non-magnetic support is equal to or greater than 2.0 μm, excellent film forming properties and higher strength can be obtained.

In a case where the thickness of the non-magnetic support is equal to or smaller than 80.0 μm, the thickness of the entire magnetic tape does not become unnecessarily excessively thick.

The thicknesses of the non-magnetic support and each layer of the magnetic recording medium which will be described later can be acquired by exposing a cross section of the magnetic recording medium in a thickness direction by a well-known method such as ion beams or a microtome, observing the exposed cross section with a scanning electron microscope, and obtaining a thickness measured regarding a portion in a thickness direction in the observed cross section or obtaining an arithmetical mean of thicknesses measured in randomly extracted plural portions (for example, two portions).

Magnetic Layer

The magnetic recording medium of this disclosure includes a magnetic layer at least on one surface of the non-magnetic support described above. The magnetic recording medium of this disclosure may include the magnetic layer only on one surface of the non-magnetic support or may include the magnetic layer on both surfaces of the non-magnetic support.

The magnetic layer includes particles of at least one kind of epsilon type iron oxide-based compound selected from the group consisting of $\varepsilon$-$Fe_2O_3$ and a compound represented by Formula (1), an abrasive, and a binding agent.

Hereinafter, each component of the magnetic layer will be described in detail.

Particles of Epsilon Type Iron Oxide-Based Compound

The magnetic layer includes particles of at least one kind of epsilon type iron oxide-based compound selected from the group consisting of $\varepsilon$-$Fe_2O_3$ and a compound represented by Formula (1).

$$\varepsilon\text{-}A_aFe_{2-a}O_3 \quad (1)$$

In Formula (1), A represents at least one kind of metal element other than Fe, and a satisfies a relationship of $0<a<2$.

The compound represented by Formula (1) is a compound in which a part of $Fe^{3+}$ ion site of $\varepsilon$-$Fe_2O_3$ is substituted with a metal element other than Fe.

By substituting a part of $Fe^{3+}$ ion site of $\varepsilon$-$Fe_2O_3$ with a metal element other than Fe, it is possible to adjust magnetic properties or further stabilize a crystal structure of epsilon type iron oxide, for example.

The kind and the number of metal elements are not particularly limited, as long as A in Formula (1) is at least one kind of metal element other than Fe.

For example, from viewpoints of more easily forming a crystal structure of epsilon type iron oxide and more easily stabilizing the formed crystal structure, A in Formula (1) is preferably at least one kind of metal element selected from the group consisting of Ga, Al, In, Rh, Co, Ni, Mn, Zn, Ti, Sn, and Nb, more preferably at least one kind of metal element selected from the group consisting of Ga, Al, In, Co, Zn, Ti, and Nb, and even more preferably at least one kind of metal element selected from the group consisting of Ga, Al, In, Co, and Ti.

a in Formula (1) preferably satisfies a relationship of $0.01<a<1.8$ and more preferably satisfies a relationship of $0.05<a<1.5$, from viewpoints of forming properties and stability of a crystal structure of epsilon type iron oxide.

Examples of the compound represented by Formula (1) include a compound represented by Formula (2), a compound represented by Formula (3), a compound represented by Formula (4), a compound represented by Formula (5), and a compound represented by Formula (6).

$$\varepsilon\text{-}Z_zFe_{2-z}O_8 \quad (2)$$

In Formula (2), Z represents at least one kind of trivalent metal element selected from the group consisting of Ga, Al, and In. z satisfies a relationship of $0<z<2$.

z in Formula (2) preferably satisfies a relationship of $0.1<z<1.9$ and more preferably satisfies a relationship of $0.2<z<1.8$, from viewpoints of forming properties and stability of a crystal structure of epsilon type iron oxide.

Specific examples of the compound represented by Formula (2) include $\varepsilon$-$Ga_{(0.4)}Fe_{(1.6)}O_3$, $\varepsilon$-$Al_{(0.3)}Fe_{(1.7)}O_3$, and $\varepsilon$-$In_{(0.1)}Fe_{(1.9)}O_3$.

$$\varepsilon\text{-}X_xY_yFe_{2-x-y}O_3 \quad (3)$$

In Formula (3), X represents at least one kind of divalent metal element selected from the group consisting of Co, Ni, Mn, and Zn, and Y represents at least one kind of tetravalent metal element selected from the group consisting of Ti and Sn. x satisfies a relationship of $0<x<1$ and y satisfies a relationship of $0<y<1$.

Examples of a preferable aspect of a combination of X and Y in Formula (3) include an aspect in which X is Co and Y is Ti, an aspect in which X is Zn and Y is Ti, and an aspect in which X is Mn and Y is Ti, from a viewpoint of easily decreasing distribution of magnetic properties.

Regarding x and y in Formula (3), x preferably satisfies a relationship of $0.01<x<0.9$ and y preferably satisfies a relationship of $0.01<y<0.9$, and x more preferably satisfies a relationship of $0.02<x<0.8$ and y more preferably satisfies a relationship of $0.02<y<0.8$, from viewpoints of forming properties and stability of a crystal structure of epsilon type iron oxide.

Specific examples of the compound represented by Formula (3) include $\varepsilon$-$Co_{(0.05)}Ti_{(0.05)}Fe_{(1.90)}O_3$ and $\varepsilon$-$Zn_{(0.02}(_{0.02})Fe_{(1.96)}O_3$.

$$\varepsilon\text{-}X_xZ_zFe_{2-x-z}O_3 \quad (4)$$

In Formula (4), X represents at least one kind of divalent metal element selected from the group consisting of Co, Ni, Mn, and Zn, and Z represents at least one kind of trivalent metal element selected from the group consisting of Ga, Al, and In. x satisfies a relationship of $0<x<1$ and z satisfies a relationship of $0<z<1$.

Examples of a preferable aspect of a combination of X and Z in Formula (4) include an aspect in which X is Co and Z is Ga, an aspect in which X is Zn and Z is Al, and an aspect in which X is Co and Z is Al, from viewpoints of further stabilizing a crystal structure of epsilon type iron oxide and easily decreasing distribution of magnetic properties.

Regarding x and z in Formula (4), x preferably satisfies a relationship of $0.01<x<0.9$ and z preferably satisfies a relationship of $0.01<z<0.9$, and x more preferably satisfies a relationship of $0.02<x<0.8$ and z more preferably satisfies a relationship of $0.02<z<0.8$, from viewpoints of forming properties and stability of a crystal structure of epsilon type iron oxide.

Specific examples of the compound represented by Formula (4) include $\varepsilon$-$Co_{(0.02)}Ga_{0.38}Fe_{(1.6)}O_3$ and $\varepsilon$-$Zn_{(0.01)}Ga_{(0.39)}Fe_{(1.6)}O_3$.

$$\varepsilon\text{-}Y_yZ_zFe_{2-y-z}O_3 \quad (5)$$

In Formula (5), Y represents at least one kind of tetravalent metal element selected from the group consisting of Ti and Sn, and Z represents at least one kind of trivalent metal element selected from the group consisting of Ga, Al, and In. y satisfies a relationship of $0<y<1$ and z satisfies a relationship of $0<z<1$.

Examples of a preferable aspect of a combination of Y and Z in Formula (5) include an aspect in which Y is Ti and Z is Ga and an aspect in which Y is Ti and Z is Al, from viewpoints of further stabilizing a crystal structure of epsilon type iron oxide and easily decreasing distribution of magnetic properties.

Regarding y and z in Formula (5), y preferably satisfies a relationship of $0.01<y<0.9$ and z preferably satisfies a relationship of $0.01<z<0.9$, and x more preferably satisfies a relationship of $0.02<y<0.8$ and z more preferably satisfies a relationship of $0.02<z<0.8$, from viewpoints of forming properties and stability of a crystal structure of epsilon type iron oxide.

Specific examples of the compound represented by Formula (5) include $\varepsilon$-$Ti_{(0.01)}Ga_{(0.39)}Fe_{(1.6)}O_3$ and $\varepsilon$-$Ti_{(0.01)}Al_{(0.39)}Fe_{(1.6)}O_3$.

$$\varepsilon\text{-}X_xY_yZ_zFe_{2-x-y-z}O_3 \quad (6)$$

In Formula (6), X represents at least one kind of divalent metal element selected from the group consisting of Co, Ni, Mn, and Zn, Y represents at least one kind of tetravalent metal element selected from the group consisting of Ti and Sn, and Z represents at least one kind of trivalent metal element selected from the group consisting of Ga, Al, and In. x satisfies a relationship of 0<x<1, y satisfies a relationship of 0<y<1, z satisfies a relationship of 0<z<1, and x+y+z<2.

Examples of a preferable aspect of a combination of X, Y, and Z in Formula (6) include an aspect in which X is Co, Y is Ti, and Z is Ga, an aspect in which X is Co, Y is Ti, and Z is Al, an aspect in which X is Zn, Y is Ti, and Z is Ga, and an aspect in which X is Zn, Y is Ti, and Z is Al, from viewpoints of further stabilizing a crystal structure of epsilon type iron oxide and easily decreasing distribution of magnetic properties.

Regarding x, y, and z in Formula (6), x preferably satisfies 0.01<x<0.9, y preferably satisfies 0.01<y<0.9, z preferably satisfies a relationship of 0.01<z<0.9, and x more preferably satisfies a relationship of 0.02<x<0.8, y more preferably satisfies a relationship of 0.02<y<0.8, and z more preferably satisfies a relationship of 0.02<z<0.8, from viewpoints of forming properties and stability of a crystal structure of epsilon type iron oxide.

Specific examples of the compound represented by Formula (6) include $\varepsilon$-Co$_{(0.05)}$Ti$_{(0.05)}$Ga$_{(0.30)}$Fe$_{(1.60)}$O$_3$, $\varepsilon$-Co$_{(0.05)}$Ti$_{(0.05)}$Al$_{(0.30)}$Fe$_{(1.60)}$O$_3$, and $\varepsilon$-Zn$_{(0.05)}$Ti$_{(0.05)}$Ga$_{(0.30)}$Fe$_{(1.60)}$O$_3$.

Among these, the compound represented by Formula (1) is preferably the compound represented by Formula (2), the compound represented by Formula (3), or the compound represented by Formula (6), more preferably the compound represented by Formula (2) or the compound represented by Formula (6), from a viewpoint of forming properties of a crystal structure of epsilon type iron oxide, and even more preferably the compound represented by Formula (2), from viewpoints of forming properties and stability of a crystal structure of epsilon type iron oxide.

The shape of the particles of the epsilon type iron oxide-based compound is not particularly limited and a shape such as a sphere shape, a rod shape, or a needle shape is used.

Among these, the shape of the particles of the epsilon type iron oxide-based compound is preferably a sphere shape. The sphere shape is preferable from viewpoints of dispersion and alignment, because a specific surface area can be further decreased, compared to cases of the other shapes.

An average equivalent circle diameter of the particles of the epsilon type iron oxide-based compound is 7 nm to 18 nm, more preferably 8 nm to 16 nm, and even more preferably 9 nm to 14 nm.

In a case where the average equivalent circle diameter of the particles of the epsilon type iron oxide-based compound is in the range described above, a magnetic recording medium having an excellent SNR can be realized.

In a case where the average equivalent circle diameter of the particles of the epsilon type iron oxide-based compound is equal to or greater than 7 nm, a crystal structure of epsilon type iron oxide is stabilized and distribution of magnetic properties is decreased.

In a case where the average equivalent circle diameter of the particles of the epsilon type iron oxide-based compound is equal to or smaller than 18 nm, it is easy to adjust magnetic properties to be suitable for recording and reproducing, and thus, a magnetic recording medium having an excellent SNR can be realized.

In this disclosure, the "average equivalent circle diameter of the particles of the epsilon type iron oxide-based compound" means a number average value of equivalent circle diameters of 500 particles of the epsilon type iron oxide-based compound.

The equivalent circle diameter of each particle of the epsilon type iron oxide-based compound is acquired with a transmission electron microscope (TEM). Specifically, a diameter of a circle having the same area as the area (that is, projected area) of the particle of the epsilon type iron oxide-based compound in a TEM image was set as an equivalent circle diameter.

A specific example of a measurement method of the average equivalent circle diameter of the particles of the epsilon type iron oxide-based compound is as shown in examples which will be described later.

The average equivalent circle diameter of the particles of the epsilon type iron oxide-based compound included in the magnetic layer can be measured by extracting the particles of the epsilon type iron oxide-based compound from the magnetic layer by the following method, for example.

(1) The surface treatment is performed with respect to the surface of the magnetic layer with a plasma reactor manufactured by Yamato Scientific Co., Ltd. for 1 minute to 2 minutes, and an organic component (for example, a binding agent) on the surface of the magnetic layer is incinerated and removed.

(2) A filter paper dipped in an organic solvent such as cyclohexanone or acetone is bonded to an edge part of a metal rod. The surface of the magnetic layer subjected to the treatment of (1) is rubbed on the edge part of the metal rod to which the filter paper is bonded, and the component of the magnetic layer is peeled off and transferred to the filter paper from the magnetic recording medium.

(3) The component of the magnetic layer peeled in the section (2) is shaken off to fall into an organic solvent such as cyclohexanone or acetone (specifically, the filter paper is put into the solvent and the component is shaken off by an ultrasonic disperser), the organic solvent is dried, and the peeled component of the magnetic layer is extracted.

(4) The component of the magnetic layer extracted in the section (3) is put into a sufficiently washed glass test tube, approximately 20 ml of n-butylamine (the amount capable of decomposing the remaining binding agent without being incinerated) is added thereto, and the glass test tube is sealed.

(5) The sealed glass test tube is heated at 170° C. for 20 hours or longer, and the binding agent component and the curing agent component are decomposed.

(6) The precipitate after the decomposition obtained in the section (5) is sufficiently washed with pure water and dried, and particles of the epsilon type iron oxide-based compound are extracted.

The average equivalent circle diameter of the particles of the epsilon type iron oxide-based compound can be controlled according to a firing temperature in a case of preparing particles of the epsilon type iron oxide-based compound, the kind of metal element to be substituted, and the like. For example, the average equivalent circle diameter of the particles of the epsilon type iron oxide-based compound can be increased by increasing a firing temperature in a case of preparing the particles or can be decreased by decreasing the firing temperature.

The magnetic layer may include only one kind or two or more kinds of particles of the epsilon type iron oxide-based compound.

A content of the particles of the epsilon type iron oxide-based compound in the magnetic layer is not particularly limited, and is, for example, preferably 50% by mass to 90% by mass and more preferably 60% by mass to 90% by mass with respect to the amount of solid contents of the magnetic layer.

In a case where the content of the particles of the epsilon type iron oxide-based compound in the magnetic layer is equal to or greater than 50% by mass with respect to the amount of solid contents of the magnetic layer, recording density can be further improved.

In a case where the content of the particles of the epsilon type iron oxide-based compound in the magnetic layer is equal to or smaller than 90% by mass with respect to the amount of solid contents of the magnetic layer, a film of the magnetic layer can be further hardened, and thus, sliding properties with a head is more easily ensured.

Manufacturing Method of Particles of Epsilon Type Iron Oxide-Based Compound

The manufacturing method of the particles of the epsilon type iron oxide-based compound is not particularly limited, and a well-known manufacturing method can be used. For the manufacturing method of the particles of the epsilon type iron oxide-based compound, a description disclosed in paragraphs 0021 to 0041 of JP2017-24981A can be referred to, for example.

An example of the manufacturing method of the particles of the epsilon type iron oxide-based compound is shown below.

(1) An acidic aqueous solution including a trivalent iron ion or a trivalent iron ion and a metal ion of a metal element which is finally substituted with a $Fe^{3+}$ ion site (hereinafter, referred to as a "raw material aqueous solution") is prepared. A supply source of a trivalent iron ion or a metal ion of a metal element to be substituted is not particularly limited, and a water-soluble inorganic acid salt such as nitrate, sulfate, or chloride is preferable, from viewpoint of availability and cost, for example.

(2) The raw material aqueous solution is neutralized by using an alkali aqueous solution (for example, ammonia aqueous solution), and hydroxide sol (hereinafter, also referred to as a "precursor-containing aqueous solution") is prepared.

(3) Tetraethoxysilane (TEOS: Tetraethyl orthosilicate) is added dropwise to the precursor-containing aqueous solution and stirred for 1 hour to 24 hours.

(4) Centrifugal separation is performed with respect to the solution after the stirring at 1,000 rpm (round per minute; the same applies hereinafter) to 10,000 rpm for 1 minute to 60 minutes, and a precipitate is collected.

(5) The collected precipitate is dried in a drying machine (for example, oven) at an internal atmosphere temperature of 60° C. to 110° C., and accordingly, a precursor of particles of an epsilon type iron oxide-based compound is obtained. The precursor is particles in which a Si-containing coating film generated by hydrolysis of TEOS is formed.

(6) A furnace is filled with the obtained precursor of particles of an epsilon type iron oxide-based compound, and fired at a temperature of 800° C. to 1,200° C. for 1 hour to 10 hours, and a fired product is obtained.

(7) The obtained fired product is put into an alkali aqueous solution (for example, a strong alkali aqueous solution such as a sodium hydroxide aqueous solution or potassium hydroxide aqueous solution), and stirred for 1 hour to 24 hours by holding a liquid temperature at 25° C. to 80° C., and thus, a Si-containing coating film formed in the section (5) is removed.

(8) After removing the Si-containing coating film, centrifugal separation is performed at 1,000 rpm to 10,000 rpm for 1 minute to 60 minutes, and a precipitate is collected.

(9) The collected precipitate is dried in a drying machine (for example, oven) at an internal atmosphere temperature of 60° C. to 110° C., and accordingly, particles of an epsilon type iron oxide-based compound are obtained.

The confirmation of the iron oxide-based compound having an epsilon type crystal structure can be performed by an X-ray diffraction (XRD) method.

In addition, the composition of the particles of the epsilon type iron oxide-based compound is confirmed by a high-frequency inductively coupled plasma (ICP) emission spectral analysis method. Specifically, a vessel containing 12 mg of sample particles and 10 ml of a hydrochloric acid aqueous solution having a concentration of 4 mol/L is held on a hot plate at a set temperature of 80° C. for 3 hours, and a solution is obtained. Then, the obtained solution is filtered by using a membrane filter having a hole diameter of 0.1 μm. The element analysis of the filtrate obtained as described above is performed by using a high-frequency inductively coupled plasma (ICP) emission spectral analysis device (product name: ICPS-8100, manufactured by Shimadzu Corporation). A content of each metal atom with respect to 100 atom % of iron atoms is obtained based on the result obtained from the element analysis.

Abrasive

The magnetic layer includes an abrasive.

In the magnetic layer, the abrasive contributes to reduction of tape damage such as wear or scratches which may occur during running of a magnetic recording medium, and removal of attached materials (so-called debris) attached to a head during use of a magnetic recording medium.

Examples of the abrasive include α-alumina, β-alumina, silicon carbide, chromium oxide, cerium oxide, α-iron oxide, corundum, artificial diamond, silicon nitride, silicon carbide, titanium carbide, titanium oxide, silicon dioxide, and boron nitride, for example, mainly particles of a well-known material having Mohs hardness equal to or greater than 6.

As the abrasive, a complex of the abrasives described above (for example, abrasive subjected to surface treatment with another abrasive) may be used. A compound or an element other than the main component may be included in the abrasive, but there is no change in effect, as long as the content of the main component is equal to or greater than 90% by mass.

The shape of the abrasive is not particularly limited and examples thereof include a particle shape such as a needle shape, a sphere shape, a cube shape, and a rectangular shape. Among these, the shape of the abrasive is preferably a shape having a shape including a corner in a part of the particle, such as a needle shape or a cube shape, from a viewpoint of obtaining further excellent abrasive properties, for example.

An average equivalent circle diameter of the abrasive in a plan view of the magnetic layer is 20 nm to 1,000 nm and a coefficient of variation of the equivalent circle diameter thereof is 30% to 60%.

In a case where the average equivalent circle diameter and the coefficient of variation of the equivalent circle diameter of the abrasive in a plan view of the magnetic layer are in the range described above, a magnetic recording medium having an excellent SNR and excellent scratch resistance of the magnetic layer can be realized.

In a case where the average equivalent circle diameter of the abrasive in a plan view of the magnetic layer is equal to or greater than 20 nm, abrasive properties of the abrasive are exhibited in an excellent manner and debris is hardly accumulated, thereby realizing a magnetic recording medium having an excellent SNR as initial properties. In addition, excellent film hardness of the magnetic layer is obtained.

In a case where the average equivalent circle diameter of the abrasive in a plan view of the magnetic layer is equal to or smaller than 1,000 nm, a decrease in signal intensity due to a local decrease in SQ is prevented, thereby realizing a magnetic recording medium having an excellent SNR.

In a case where the coefficient of variation of the equivalent circle diameter of the abrasive in a plan view of the magnetic layer is equal to or greater than 30%, a suitable size difference is obtained. Accordingly, excellent abrasive properties are obtained and debris is hardly accumulated. In a case where the coefficient of variation of the equivalent circle diameter of the abrasive in a plan view of the magnetic layer is equal to or smaller than 60%, abrasive having a large size is present at the edge, thereby realizing a magnetic recording medium having excellent scratch resistance of the magnetic layer.

The average equivalent circle diameter of the abrasive in a plan view of the magnetic layer is preferably 20 nm to 1,000 nm, more preferably 25 nm to 900 nm, and even more preferably 30 nm to 800 nm.

The coefficient of variation of the equivalent circle diameter of the abrasive in a plan view of the magnetic layer is preferably 30% to 60%, more preferably 33% to 55%, and even more preferably 35% to 50%.

The average equivalent circle diameter and the coefficient of variation of the equivalent circle diameter of the abrasive in a plan view of the magnetic layer can be controlled by, for example, adjusting a period of time for dispersing the abrasive (dispersion time), a temperature for dispersing the abrasive (dispersion temperature), the amount of a dispersing agent for dispersing the abrasive, a mixing ratio of the abrasive and the particles of the epsilon type iron oxide-based compound, and drying conditions of a coating film, in a step of preparing a magnetic layer forming composition which will be described later.

The average equivalent circle diameter of the abrasive in a plan view of the magnetic layer is acquired from an image (so-called SEM image) of the abrasive imaged by using a field emission-scanning electron microscope (FE-SEM). Specifically, the average equivalent circle diameter thereof is acquired by the following method.

1. Acquiring SEM Image

A two-dimensional electron image was acquired by using a field emission-scanning electron microscope, by setting a probe current as Normal under the conditions of an accelerating voltage of 5 kV, a working direction (W.D.) of 8 mm and an imaging magnification of 20,000, without performing a coating process before the imaging.

2. Image Analysis

The image analysis is performed by the following procedure using image analysis software. An area is acquired as a pixel (unit).

(1) Image data (SEM (20 K) jpg image) of an SEM image acquired in the section of "1. Acquiring SEM Image" is dragged and dropped to the image analysis software.

(2) Then, an area of the image having a vertical length of 4.3 μm and a horizontal length of 6.3 μm, excluding a part where a magnification and scale are displayed, is selected as an analysis region.

(3) Next, a binary coded process of the analysis region is performed. Specifically, 150 gradation is selected as a lower limit value and 255 gradation is selected as an upper limit value, and a binary coded process with these two threshold values is performed. By performing the binary coded process, an area of each white shining part on the analysis region is obtained.

(4) A size of a circle having the equivalent area as the area of each part (so-called equivalent circle diameter) is acquired by Expression (A).

(5) The equivalent circle diameters of 500 abrasives are acquired, and an average value (that is, average equivalent circle diameter) and a coefficient of variation are calculated.

$$\text{Equivalent circle diameter} = \sqrt{4 \times \text{Areaofeachportion}/\pi} \quad (A)$$

As the field emission-scanning electron microscope, FE-SEM S4800 manufactured by Hitachi, Ltd. can be used, for example.

In addition, as the image analysis software, WinRoof manufactured by Mitani Corporation can be used.

However, the field emission-scanning electron microscope and the image analysis software are not limited thereto.

A BET specific surface area of the abrasive is preferably 1 m$^2$/g to 30 m$^2$/g.

A tap density of the abrasive is preferably 0.3 g/ml to 2 g/ml.

The magnetic layer may include one kind or two or more kinds of the abrasive.

As the abrasive, a commercially available product can be used.

Examples of the commercially available product include AKP-12, AKP-15, AKP-20, AKP-30, AKP-50, HIT20, HIT-30, HIT-55, HIT60A, HIT70, HIT80, and HIT100 manufactured by Sumitomo Chemical Co., Ltd., ERC-DBM, HP-DBM, and HPS-DBM manufactured by Reynolds Co., Ltd., WA10000 manufactured by Fujimi Incorporated, UB20 manufactured by Uyemura & Co., Ltd., G-5, Kromex U2, and Kromex U1 manufactured by Nippon Chemical Industrial Co., Ltd., TF100 and TF140 manufactured by Toda Kogyo Corp., Beta Random Ultrafine manufactured by IBIDEN CO., LTD., and B-3 manufactured by Showakogyo Co., Ltd (all of the above examples are product names).

A content of the abrasive in the magnetic layer is not particularly limited, and is, for example, preferably 0.1 parts by mass to 20 parts by mass and more preferably 0.5 parts by mass to 15 parts by mass, with respect to 100 parts by mass of the particles of the epsilon type iron oxide-based compound.

In a case where the content of the abrasive in the magnetic layer is equal to or greater than 0.1 parts by mass with respect to 100 parts by mass of the particles of the epsilon type iron oxide-based compound, scratch resistance of the magnetic layer can be further improved.

In a case where the content of the abrasive in the magnetic layer is equal to or smaller than 20 parts by mass with respect to 100 parts by mass of the particles of the epsilon type iron oxide-based compound, an effect to the content of the particles of the epsilon type iron oxide-based compound is small, thereby realizing a magnetic recording medium having a further excellent SNR.

Binding Agent

The magnetic layer includes a binding agent.

The binding agent in the magnetic layer functions as a binder.

Various resins are used as the binding agent.

The resin used for the binding agent is not particularly limited, as long as it can form a layer satisfying physical properties such as desired hardness or durability.

The resin used for the binding agent may be a homopolymer or a copolymer. The resin may be a well-known electron beam-curable resin.

Examples of the resin used for the binding agent include polyurethane, a polyester-based resin, a polyamide-based resin, a vinyl chloride-based resin, styrene, acrylonitrile, an acryl resin obtained by (co)polymerization of methyl methacrylate, a cellulose resin such as nitrocellulose, an epoxy resin, a phenoxy resin, and a polyvinylalkylal resin such as polyvinyl acetal or polyvinyl butyral.

Among these, as the resin used for the binding agent, at least one kind selected from the group consisting of polyurethane, an acryl-based resin, a cellulose-based resin, and a vinyl chloride-based resin is preferable.

The resin used for the binding agent preferably includes a functional group (for example, polar group) adsorbed to the surface of the particles of the epsilon type iron oxide-based compound in a molecule, from a viewpoint of further improving dispersibility of the particles of the epsilon type iron oxide-based compound, for example.

Examples of the preferable functional group include $-SO_3M$, $-SO_4M$, $-PO(OM)_2$, $-OPO(OM)_2$, $-COOM$, $=NSO_3M$, $-NRSO_3M$, $-NR^1R^2$, and $-N^+R^1R^2R^3X^-$.

Here, M represents a hydrogen atom or an alkali metal atom such as Na or K. R represents an alkylene group, R1, R2, and R3 each independently represent a hydrogen atom, an alkyl group, or a hydroxyalkyl group. X represents a halogen atom such as Cl or Br.

In a case where the resin used for the binding agent includes the functional group, the content of the functional group in the resin is preferably 0.01 meq/g to 2.0 meq/g, and more preferably 0.3 meq/g to 1.2 meq/g.

In a case where the content of the functional group in the resin is in the range described above, further excellent dispersibility of the particles of the epsilon type iron oxide-based compound in the magnetic layer is obtained and magnetic flux density can be further improved.

As the resin used for the binding agent, polyurethane including a $-SO_3Na$ group is more preferable. In a case where polyurethane includes the $-SO_3Na$ group, the content of $-SO_3Na$ group is preferably 0.01 meq/g to 1.0 meq/g with respect to that of polyurethane.

A molecular weight of the resin used as the binding agent can be, for example, 10,000 to 200,000 as a weight-average molecular weight.

The weight-average molecular weight in this disclosure is a value obtained by performing polystyrene conversion of a value measured by gel permeation chromatography (GPC). As the measurement conditions, the following conditions can be used.

Conditions
GPC device: HLC-8120 (manufactured by Tosoh Corporation)
Column: TSK gel Multipore HXL-M (manufactured by Tosoh Corporation, 7.8 mmID (inner diameter)×30.0 cm)
Eluent: Tetrahydrofuran (THF)
Sample concentration: 0.5% by mass
Sample injection amount: 10 μl
Flow rate: 0.6 ml/min
Measurement temperature: 40° C.
Detector: RI detector The magnetic layer may include one kind or two or more kinds of binding agent.

The content of the binding agent in the magnetic layer is not particularly limited, and is, for example, preferably 1 part by mass to 30 parts by mass and more preferably 2 parts by mass to 20 parts by mass with respect to 100 parts by mass of the particles of the epsilon type iron oxide-based compound.

In a case where the content of the binding agent in the magnetic layer is in the range described above with respect to 100 parts by mass of the particles of the epsilon type iron oxide-based compound, further excellent dispersibility of the particles of the epsilon type iron oxide-based compound in the magnetic layer is obtained and magnetic flux density can be further improved.

Other Additives

The magnetic layer may include various additives (that is, other additives), if necessary, other than the particles of the epsilon type iron oxide-based compound, the abrasive, and the binding agent, with in a range not negatively affecting the effects of the embodiment.

Examples of the other additives include a non-magnetic filler, a lubricant, a dispersing agent, a dispersing assistant, an antibacterial agent, an antistatic agent, and an antioxidant.

One component of the other additives may exhibit two or more functions.

Non-Magnetic Filler

The magnetic layer can include a non-magnetic filler.

The non-magnetic filler contributes to adjustment of physical properties of film hardness or surface roughness of the magnetic layer.

In this disclosure, the "non-magnetic filler" means a filler satisfying at least one of a residual magnetic flux density equal to or smaller than 10 mT and coercivity equal to or smaller than 7.98 kA/m (100 Oe).

As the non-magnetic filler, carbon black or inorganic particles are used.

For example, as the non-magnetic filler, colloid particles are preferable, from viewpoints of dispersion stability and uniform disposition in the magnetic layer. In addition, at least one kind selected from the group consisting of carbon black and inorganic colloid particles is preferable, and at least one kind selected from the group consisting of carbon black and inorganic oxide colloid particles is more preferable, as the non-magnetic filler, from a viewpoint of availability, for example.

Examples of the inorganic oxide colloid particles include colloid particles of complex inorganic oxide such as $SiO_2/Al_2O_3$, $SiO_2/B_2O_3$, $TiO_2/CeO_2$, $SnO_2/Sb_2O_3$, $SiO_2/Al_2O_3/TiO_2$, or $TiO_2/CeO_2/SiO_2$, in addition to colloid particles of inorganic oxide such as α-alumina having an α transformation rate equal to or greater than 90%, β-alumina, γ-alumina, θ-alumina, silicon dioxide, silicon carbide, chromium oxide, cerium oxide, α-iron oxide, goethite, corundum, silicon nitride, titanium carbide, titanium dioxide, tin oxide, magnesium oxide, tungsten oxide, zirconium oxide, boron nitride, zinc oxide, calcium carbonate, calcium sulfate, barium sulfate, and molybdenum disulfide.

As the inorganic oxide colloid particles, silica colloid particles (colloidal silica) are particularly preferable, from a viewpoint of availability of monodisperse colloid particles.

An average particle diameter of the non-magnetic filler is not particularly limited, and is, for example, preferably 30 nm to 300 nm, more preferably 40 nm to 250 nm, and even more preferably 50 nm to 200 nm, from viewpoints of reducing recording errors and ensuring spacing of a head.

In this disclosure, the average particle diameter of the non-magnetic filler is a value measured by a transmission electron microscope (TEM). In addition, the non-magnetic filler can be extracted from the magnetic layer by the same method as the method of extracting the particles of the epsilon type iron oxide-based compound from the magnetic layer described above.

In a case where the magnetic layer includes the non-magnetic filler, one kind or two or more kinds of the non-magnetic filler may be included.

As the non-magnetic filler, a commercially available product can be used.

In a case where the magnetic layer includes the non-magnetic filler, a content of the non-magnetic filler in the magnetic layer is not particularly limited, and is, for example, preferably 0.01 parts by mass to 10 parts by mass with respect to 100 parts by mass of the particles of the epsilon type iron oxide-based compound.

Lubricant

The magnetic layer can include a lubricant.

The lubricant contributes to the improvement of running durability of the magnetic recording medium.

As the lubricant, a well-known hydrocarbon-based lubricant and a fluorine-based lubricant can be used.

Examples of the hydrocarbon-based lubricant include a carboxylic acid-based compound such as stearic acid or oleic acid, an ester-based compound such as butyl stearate, a sulfonic acid-based compound such as octadecylsulfonic acid, a phosphoric acid ester-based compound such as monoctadecyl phosphate, an alcohol-based compound such as stearyl alcohol or oleyl alcohol, a carboxylic acid amide-based compound such as stearic acid amide, and an amine-based compound such as stearyl amine.

As the hydrocarbon-based lubricant, a compound including a polar group such as a hydroxyl group, an ester group, or a carboxyl group in a hydrocarbon chain of the alkyl group is preferable, from a viewpoint of a high effect of decreasing a frictional force.

As the fluorine-based lubricant, a compound obtained by substituting a part of or the entire alkyl group of the hydrocarbon-based lubricant described above with a fluoroalkyl group or a perfluoropolyether group.

In a case where the magnetic layer includes the lubricant, one kind or two or more kinds of lubricant may be included.

As the lubricant, a commercially available product can be used.

In a case where the magnetic layer includes the lubricant, a content of the lubricant in the magnetic layer is not particularly limited, and is, for example, preferably 0.1 parts by mass to 20 parts by mass and more preferably 0.5 parts by mass to 15 parts by mass, with respect to 100 parts by mass of the particles of epsilon type iron oxide-based compound.

Dispersing Agent

The magnetic layer can include a dispersing agent.

In the magnetic layer, the dispersing agent contributes to improvement of dispersibility of the particles of the epsilon type iron oxide-based compound and prevention of aggregation of the particles. In addition, the dispersing agent also contributes to the improvement of dispersibility of the abrasive.

As the dispersing agent, an organic compound including a functional group which is adsorbed to the surface of the particles of the epsilon type iron oxide-based compound is preferable.

As the organic compound including a functional group which is adsorbed to the surface of the particles of the epsilon type iron oxide-based compound, a compound including one to three groups of an amino group, a carboxyl group, a sulfonic acid group, or a sulfinic acid group is used, and a polymer thereof may be used.

Examples of the preferable dispersing agent include compounds represented by structural formulae of R—NH$_2$, NH$_2$—R—NH$_2$, NH$_2$—R(NH$_2$)—NH$_2$, R—COOH, COOH—R—COOH, COOH—R(COOH)—COOH, R—SO$_3$H, SO$_3$H—R—SO$_3$H, SO$_3$H—R(SO$_3$H)—SO$_3$H, R—SO$_2$H, SO$_2$H—R—SO$_2$H, and SO$_2$H—R(SO$_2$H)—SO$_2$H.

R in the structural formulae is linear, branched, or cyclic saturated or unsaturated hydrocarbon, and is preferably an alkyl group having 1 to 20 carbon atoms, for example.

Specific examples of the preferable dispersing agent include oleic acid, 2,3-dihydroxynaphthalene, and stearic acid.

Among these, the dispersing agent is more preferably at least one kind selected from oleic acid and 2,3-dihydroxynaphthalene from a viewpoint of dispersibility.

In a case where the magnetic layer includes a dispersing agent, one kind or two or more kinds of the dispersing agent may be used.

As the dispersing agent, a commercially available product can be used.

In a case where the magnetic layer includes the dispersing agent, a content of the dispersing agent in the magnetic layer is preferably 0.1 parts by mass to 30 parts by mass with respect to 100 parts by mass which is a total of the particles of the epsilon type iron oxide-based compound and the abrasive.

In a case where the content of the dispersing agent in the magnetic layer is in the range described above with respect to 100 parts by mass which is a total of the particles of the epsilon type iron oxide-based compound and the abrasive, further excellent dispersibility of the particles of the epsilon type iron oxide-based compound and the abrasive is obtained and scratch resistance can be further improved.

Thickness of Magnetic Layer

A thickness of the magnetic layer is not particularly limited, and is suitably selected according to a saturation magnetization amount of a magnetic head used, a head gap length, a recording signal band, and the like.

The thickness of the magnetic layer is preferably 10 nm to 150 nm, more preferably 20 nm to 120 nm, and even more preferably 30 nm to 100 nm.

In a case where the thickness of the magnetic layer is equal to or greater than 10 nm, recording density can be further improved.

In a case where the thickness of the magnetic layer is equal to or smaller than 150 nm, noise is further reduced and more excellent electromagnetic conversion characteristics are obtained.

The magnetic recording medium of this disclosure may include at least one layer of the magnetic layer or, for example, may include two layers of the magnetic layer having different magnetic properties, and a configuration regarding a well-known multilayered magnetic layer can be applied. In a case where the magnetic layer is a multilayered magnetic layer, the thickness of the magnetic layer is a total thickness of the plurality of magnetic layers.

Hereinafter, the non-magnetic layer and the back coating layer which are predetermined layers of the magnetic recording medium will be described.

Non-Magnetic Layer

The non-magnetic layer is a layer contributing to thinning of the magnetic layer.

The non-magnetic layer is preferably a layer including non-magnetic particles as a filler and a binding agent which is a film forming component, and may further include additives, if necessary.

The non-magnetic layer can be provided between the non-magnetic support and the magnetic layer.

The non-magnetic layer includes a layer not having magnetism, and a substantially non-magnetic layer including a small amount of a ferromagnetic material (for example, particles of the epsilon type iron oxide-based compound) as impurities or intentionally.

In this disclosure, the "non-magnetic layer" means a layer satisfying at least one of a residual magnetic flux density equal to or smaller than 10 mT and coercivity equal to or smaller than 7.98 kA/m (100 Oe).

Non-Magnetic Particles

The non-magnetic layer preferably includes non-magnetic particles.

In the non-magnetic layer, the non-magnetic particles can function as a filler.

In this disclosure, the "non-magnetic particles" mean particles satisfying at least one of a residual magnetic flux density equal to or smaller than 10 mT and coercivity equal to or smaller than 7.98 kA/m (100 Oe).

The non-magnetic particles may be inorganic particles or organic particles. As the non-magnetic particles, carbon black can also be used.

Examples of the inorganic particles include particles of metal, metal oxide, metal carbonate, metal sulfate, metal nitride, metal carbide, and metal sulfide.

Specific examples of the non-magnetic particles include titanium oxide such as titanium dioxide, cerium oxide, tin oxide, tungsten oxide, ZnO, $ZrO_2$, $SiO_2$, $Cr_2O_3$, α-alumina having an α transformation rate equal to or greater than 90%, β-alumina, γ-alumina, α-iron oxide, goethite, corundum, silicon nitride, titanium carbide, magnesium oxide, boron nitride, molybdenum disulfide, copper oxide, $MgCO_3$, $CaCO_3$, $BaCO_3$, $SrCO_3$, $BaSO_4$, silicon carbide, and titanium carbide.

Among these, as the non-magnetic particles, α-iron oxide is preferable.

The shape of the non-magnetic particles is not particularly limited and may be any of a needle shape, a sphere shape, a polyhedron shape, and a plate shape.

An average particle diameter of these non-magnetic particles is preferably 5 nm to 500 nm and more preferably 10 nm to 200 nm.

In a case where the average particle diameter of these non-magnetic particles is in the range described above, further excellent dispersibility is obtained and the surface roughness can be adjusted to more suitable surface roughness for the non-magnetic layer.

The dispersibility of the non-magnetic particles and the surface roughness of the non-magnetic layer can be suitably adjusted by combining non-magnetic powders having different average particle diameters or adjusting particle diameter distribution of the non-magnetic particles.

The average particle diameter of these non-magnetic particles is a value measured with a transmission electron microscope (TEM).

A BET specific surface area of the non-magnetic particles is preferably 50 $m^2/g$ to 150 $m^2/g$.

In a case where the non-magnetic layer includes non-magnetic particles, one kind or two or more kinds of the non-magnetic particles may be included.

The non-magnetic particles can be purchased as a commercially available product and can also be manufactured by a well-known method.

In a case where the non-magnetic layer includes the non-magnetic particles, a content of the non-magnetic particles in the non-magnetic layer is preferably 50% by mass to 90% by mass and more preferably 60% by mass to 90% by mass with respect to the amount of solid contents of the non-magnetic layer.

Binding Agent

The non-magnetic layer preferably includes a binding agent.

The binding agent in the non-magnetic layer is the same as the binding agent described in the section of the magnetic layer, and the preferable aspects are also the same as the preferable aspects thereof. Therefore, the description is omitted here.

Other Additives

The non-magnetic layer may include various additives (that is, other additives), if necessary, in addition to the non-magnetic particles and the binding agent.

The other additives in the non-magnetic layer is the same as the other additives described in the section of the magnetic layer, and the preferable aspects are also the same as the preferable aspects thereof. Therefore, the description is omitted here.

Thickness of Non-Magnetic Layer

A thickness of the non-magnetic layer is not particularly limited.

The thickness of the magnetic layer is preferably 0.05 μm to 3.0 μm, more preferably 0.05 μm to 2.0 μm, and even more preferably 0.05 μm to 1.5 μm.

Back Coating Layer

A back coating layer is a layer contributing to running stability.

The back coating layer is preferably a layer including non-magnetic particles as a filler, and a binding agent which is a film forming component, and may further include additives, according to the purpose.

The back coating layer can be provided on a surface of the non-magnetic support on a side opposite to the magnetic layer side.

Binding Agent

The back coating layer preferably includes a binding agent.

The binding agent in the back coating layer is the same as the binding agent described in the section of the magnetic layer, and the preferable aspects are also the same as the preferable aspects thereof. Therefore, the description is omitted here.

Other Additives

The back coating layer may include various additives (that is, other additives), if necessary, in addition to the non-magnetic particles and the binding agent.

The other additives in the back coating layer is the same as the other additives described in the section of the magnetic layer, and the preferable aspects are also the same as the preferable aspects thereof. Therefore, the description is omitted here.

Thickness of Back Coating Layer

A thickness of the back coating layer is not particularly limited.

The thickness of the back coating layer is preferably equal to or smaller than 0.9 μm and more preferably 0.1 μm to 0.7 μm.

Manufacturing Method of Magnetic Recording Medium

A manufacturing method of the magnetic recording medium of this disclosure is not particularly limited, and a well-known manufacturing method can be used.

As the manufacturing method of the magnetic recording medium of this disclosure, for example, a manufacturing method (hereinafter, also referred to as a "manufacturing method of the embodiment") including a step of a step of preparing a magnetic layer forming composition (hereinafter, also referred to as a "step A"), a step of applying the magnetic layer forming composition onto a non-magnetic support to form a magnetic layer forming composition layer (hereinafter, also referred to as a "step B"), a step of performing alignment in magnetic field of the formed magnetic layer forming composition layer (hereinafter, also referred to as a "step C"), and a step of drying the magnetic layer forming composition layer subjected to the alignment in magnetic field to form a magnetic layer (hereinafter, also referred to as a "step D") is used.

The manufacturing method of the embodiment can further include a step of performing a calender process of the non-magnetic support including the magnetic layer (hereinafter, also referred to as a "step E"), and a step of forming any layer such as a non-magnetic layer and a back coating layer (hereinafter, also referred to as a "step F").

Each step may be divided into two or more stages.

Hereinafter, each step of the manufacturing method of the embodiment will be described in detail.

Step A

The step A includes a step of mixing the particles of the epsilon type iron oxide-based compound, the abrasive, the binding agent, and, if necessary, additives (the other additives described above, a curing agent, and the like), and a solvent with each other (hereinafter, also referred to as a "step A1"), and a step of dispersing a mixed solution obtained in the mixing step (hereinafter, also referred to as a "step A2").

All of the raw materials such as the particles of the epsilon type iron oxide-based compound, the abrasive, and the binding agent may be mixed with each other in any stage of the step A.

The raw materials may be mixed with each other at the same time or in two or more parts.

For example, after mixing the binding agent with the other raw materials in the step A2, the binding agent can be further added and mixed for viscosity adjustment after the dispersion.

In the dispersion of the raw materials of the magnetic layer forming composition, a well-known dispersion apparatus such as a batch type vertical sand mill or a transverse beads mill can be used, for example.

As the dispersion beads, glass beads, zirconia beads, titania beads, and steel beads can be used, for example. A particle diameter (so-called bead diameter) and a filling percentage of the dispersion beads can be optimized and used.

In the dispersion of the raw materials of the magnetic layer forming composition, a well-known ultrasonic device can also be used, for example.

In addition, at least some raw materials of the magnetic layer forming composition may be kneaded by using an open kneader, for example, before the step A2.

Regarding the raw materials of the magnetic layer forming composition, solutions for the raw materials may be respectively prepared and mixed with each other. For example, a magnetic liquid including particles of an epsilon type iron oxide-based compound, and an abrasive solution including the abrasive can be respectively prepared, and mixed with each other for dispersion.

Magnetic Layer Forming Composition

The "particles of the epsilon type iron oxide-based compound", the "abrasive", the "binding agent", and the "other additives" for preparing the magnetic layer forming composition are the same as the "particles of the epsilon type iron oxide-based compound", the "abrasive", the "binding agent", and the "other additives" described in the section of the "magnetic layer" and the preferable aspects are also the same as the preferable aspects thereof. Therefore, the description is omitted here.

A content of the particles of the epsilon type iron oxide-based compound in the magnetic layer forming composition is preferably 5% by mass to 30% by mass and more preferably 8% by mass to 20% by mass with respect to a total mass of the magnetic layer forming composition.

A content of the abrasive in the magnetic layer forming composition is preferably 0.1 parts by mass to 20 parts by mass and more preferably 0.5 parts by mass to 15 parts by mass with respect to 100 parts by mass of the particles of the epsilon type iron oxide-based compound.

A content of the binding agent in the magnetic layer forming composition is preferably 5 parts by mass to 50 parts by mass and more preferably 10 parts by mass to 30 parts by mass with respect to 100 parts by mass of the particles of the epsilon type iron oxide-based compound.

Solvent

The solvent contributes as a dispersion medium for the particles of the epsilon type iron oxide-based compound, the abrasive, the binding agent, and the additives (other additives and a curing agent) used if necessary.

One kind or two or more kinds of the mixed solvent may be used.

As the solvent, an organic solvent is preferable.

As the organic solvent, a ketone-based compound such as acetone, methyl ethyl ketone, methyl isobutyl ketone, diisobutyl ketone, cyclohexanone, isophorone, or tetrahydrofuran, an alcohol-based compound such as methanol, ethanol, propanol, butanol, isobutyl alcohol, isopropyl alcohol, or methylcyclohexanol, an ester-based compound such as methyl acetate, butyl acetate, isobutyl acetate, isopropyl acetate, ethyl lactate, or glycol acetate, a glycol ether-based compound such as glycol dimethyl ether, glycol monoethyl ether, or dioxane, an aromatic hydrocarbon-based compound such as benzene, toluene, xylene, cresol, or chlorobenzene, a chlorinated hydrocarbon-based compound such as methylene chloride, ethylene chloride, carbon tetrachloride, chloroform, ethylene chlorohydrin, or dichlorobenzene, N, N-dimethylformamide, hexane, and the like can be used, for example.

Among these, as the organic solvent, methyl ethyl ketone, cyclohexanone, and a mixed solvent including these at any ratio are preferable.

For example, from a viewpoint of improving dispersibility, a solvent having strong polarity to some extent is preferable, and it is preferable that a content of a solvent having dielectric constant equal to or greater than 15 in the magnetic layer forming composition is equal to or greater than 50% by mass with respect to a total content of the solvent. In addition, a dissolution parameter of the solvent is preferably 8 to 11.

Curing Agent

The magnetic layer forming composition can include a curing agent.

The curing agent contributes to the improvement of film hardness. By forming a crosslinked structure between the curing agent and the binding agent described above for forming the magnetic layer, film hardness of the magnetic layer can be improved.

As the curing agent, an isocyanate-based compound is preferable.

Examples of the isocyanate-based compound include tolylene diisocyanate, 4,4'-diphenylmethane diisocyanate, hexamethylene diisocyanate, xylylene diisocyanate, naphthylene-1,5-diisocyanate, o-toluidine diisocyanate, isophorone diisocyanate, and triphenylmethane triisocyanate.

In addition, as the isocyanate-based compound, polyisocyanate such as a reaction product of the isocyanate-based compound described above and polyalcohol, and a condensation product of the isocyanate-based compound described above can also be used.

As the curing agent, a commercially available product can be used.

Examples of the commercially available product of the isocyanate-based compound which is a curing agent include CORONATE (registered trademark) L, CORONATE (registered trademark) HL, CORONATE (registered trademark) 2030, CORONATE (registered trademark) 2031, CORONATE (registered trademark) 3041, MILLIONATE (registered trademark) MR, and MILLIONATE (registered trademark) MTL manufactured by Tosoh Corporation, TAKENATE (registered trademark) D-102, TAKENATE (registered trademark) D-110N, TAKENATE (registered trademark) D-200, and TAKENATE (registered trademark) D-202 manufactured by Mitsui Chemicals, Inc., DESMODUR (registered trademark) L, DESMODUR (registered trademark) IL, DESMODUR (registered trademark) N, and DESMODUR (registered trademark) HL manufactured by Covestro Japan Ltd. (all of the above examples are product names).

In a case where the magnetic layer forming composition includes the curing agent, one kind or two or more kinds of the curing agent may be included.

As the curing agent, a commercially available product can be used.

In a case where the magnetic layer forming composition includes the curing agent, a content of the curing agent in the magnetic layer forming composition can be, for example, greater than 0 parts by mass and equal to or smaller than 80 parts by mass with respect to 100 parts by mass of the binding agent, and is preferably 50 parts by mass to 80 parts by mass, from a viewpoint of improving film hardness of each layer such as the magnetic layer.

Step B

The manufacturing method of the embodiment includes a step of applying the magnetic layer forming composition onto the non-magnetic support to form a magnetic layer forming composition layer (that is, step B), after the step A.

The step B can be performed, for example, by applying the magnetic layer forming composition onto the running non-magnetic support so as to obtain a predetermined film thickness.

The preferable film thickness of the magnetic layer is as described in the section of the "magnetic layer".

As a method of applying the magnetic layer forming composition, a well-known method such as air doctor coating, blade coating, rod coating, extrusion coating, air knife coating, squeeze coating, impregnation coating, reverse roll coating, transfer roll coating, gravure coating, kiss coating, cast coating, spray coating, spin coating can be used.

Regarding the coating method, "Latest coating technologies" published by Sogo Gijutsu Center (31 May 1983) can be referred to, for example.

Step C

The manufacturing method of the embodiment includes a step of performing alignment in magnetic field of the formed magnetic layer forming composition layer (that is, step C), after the step B.

In a case where the non-magnetic support has a film shape as a magnetic tape, alignment in magnetic field of the formed magnetic layer forming composition layer can be performed with respect to the particles of an epsilon type iron oxide-based compound included in the magnetic layer forming composition by using cobalt magnets or solenoid.

In a case where the non-magnetic support is a hard disk, isotropic orientation of the formed magnetic layer forming composition layer is sufficiently obtained without performing an alignment process without using an alignment device. A well-known random alignment device is preferably used by obliquely alternately disposing cobalt magnets or applying an alternating magnetic field by solenoid. In addition, isotropic magnetic properties can also be applied in a circumferential direction by performing homeotropic alignment by using a well-known method such as a method using a polar opposing magnet. Particularly, in a case of performing high-density recording, homeotropic alignment is preferable. In addition, circumferential alignment can also be performed by using a spin coating.

The alignment in magnetic field is preferably performed before drying the formed magnetic layer forming composition layer.

The alignment in magnetic field can be performed by a homeotropic alignment process of applying a magnetic field having magnetic field strength of 0.1 T to 1.0 T in a vertical direction to the surface of the coated magnetic layer forming composition.

Step D

The manufacturing method of the embodiment includes a step of drying the magnetic layer forming composition layer subjected to the alignment in magnetic field to form a magnetic layer (that is, step D), after the step C.

In the drying of the magnetic layer forming composition layer, it is possible to control a temperature of dry air, an air flow, or an application speed.

For example, the application speed is preferably 20 m/min to 1,000 m/min and a temperature of the dry air is preferably equal to or higher than 60° C. In addition, preliminary drying of the magnetic layer forming composition layer can be suitably performed before applying a magnetic field.

Step E

In the manufacturing method of the embodiment, after performing the step A, the step B, the step C, and the step D, a step of performing a calender process with respect to the non-magnetic support including the magnetic layer (that is, step E) is preferably performed.

The non-magnetic support including the magnetic layer is temporarily wound with a winding roll, unwound from the winding roll, and supplied for the calender process.

According to the calender process, surface smoothness is improved, and a filling percentage of the particles of an epsilon type iron oxide-based compound in the magnetic layer is improved due to disappearance of holes generated due to removal of the solvent at the time of drying. Accordingly, it is possible to obtain a magnetic recording medium having high electromagnetic conversion characteristics (for example, SNR).

The step E is preferably performed while changing calender process conditions according to smoothness of the surface of the magnetic layer.

In the calender process, a super calender roll or the like can be used, for example.

As a calender roll, a heat resistant plastic roll formed of resins such as an epoxy-based resin, a polyimide-based resin, a polyamide-based resin, a polyamideimide-based resin can be used. In addition, the process can also be performed by a metal roll.

As the calender process conditions, a temperature of the calender roll can be, for example, 60° C. to 120° C. and can be preferably set as 80° C. to 100° C., and pressure can be, for example, 100 kg/cm to 500 kg/cm (98 kN/m to 490 kN/m) and can be preferably set as 200 kg/cm to 450 kg/cm (196 kN/m to 441 kN/m).

Step F

The manufacturing method of the embodiment can include a step of forming any layer such as the non-magnetic layer and the back coating layer (that is, step F), if necessary.

The non-magnetic layer and the back coating layer can be formed by performing the same steps as the step B, the step C, and the step D regarding the magnetic layer, after preparing the composition for forming each layer.

As described in the sections of the "non-magnetic layer" and the "back coating layer", the non-magnetic layer can be provided between the non-magnetic support and the magnetic layer, and the back coating layer can be provided on a surface of the non-magnetic support on a side opposite to the magnetic layer side.

A forming composition of the non-magnetic layer and a forming composition of the back coating layer can be prepared by further adding a solvent, with components and the contents described in the sections of the "non-magnetic layer" and the "back coating layer".

Recording System of Magnetic Recording Medium

As a recording system of the magnetic recording medium of this disclosure, a helical scan recording system or a linear recording system may be used, and a linear recording system is preferable.

The magnetic recording medium of this disclosure has an excellent SNR and excellent scratch resistance of the magnetic layer, and thus, the magnetic recording medium is suitable for recording in a linear system.

In a case of using the linear recording system as the recording system of the magnetic recording medium of this disclosure, for example, from a viewpoint of ease of recording, it is more preferable that the particles of an epsilon type iron oxide-based compound included in the magnetic layer are a compound represented by Formula (1).

The magnetic recording medium of this disclosure is preferably used in electromagnetic wave assist recording.

In the magnetic recording medium of this disclosure, the particles of the epsilon type iron oxide-based compound are used as a magnetic material. The reversing of a spin of the particles of the epsilon type iron oxide-based compound is difficult due to extremely high coercivity. In the magnetic recording medium of this disclosure, the spin is easily reversed only in a case of performing the recording by using so-called electromagnetic wave assist recording of irradiating the particles of the epsilon type iron oxide-based compound included in the magnetic layer with electromagnetic waves and reversing the spin by a magnetic field while causing precession, and thus, excellent recording can be realized.

EXAMPLES

Hereinafter, the invention will be described more specifically with reference to examples, but the invention is not limited to the following examples, as long as other examples are not departed from the gist thereof.

Manufacturing of Epsilon Type Iron Oxide-Based Compound

Manufacturing of Magnetic Materials A to K (1) Preparation of Precursor-Containing Aqueous Solution An aqueous solution including a precursor of an epsilon type iron oxide-based compound (that is, precursor-containing aqueous solution) was prepared in a batch type reactor including a stirring blade by the following method.

In preparation of magnetic materials A to J, iron (III) nitrate nonahydrate [$Fe(NO_3)_3 \cdot 9H_2O$] and salt of an additive element M shown in Table 1 below are dissolved in purified water in a reactor, thereby obtaining a raw material aqueous solution. Concentrations of iron (III) nitrate nonahydrate and salt of the additive element M in the raw material aqueous solution were set as values shown in Table 1.

In preparation of a magnetic material K, iron (III) nitrate nonahydrate [$Fe(NO_3)_3 \cdot 9H_2O$] was dissolved in purified water in a reactor, thereby obtaining a raw material aqueous solution. A concentration of iron (III) nitrate nonahydrate in the raw material aqueous solution was set as a value shown in Table 1.

Then, a 28% by mass ammonia aqueous solution was added dropwise into the reactor so as to set pH of the raw material aqueous solution in the reactor to be 10.5, while continuously stirring the raw material aqueous solution with the stirring blade (dropwise addition rate: 10 $cm^3$/min), and hydroxide sol (that is, precursor-containing aqueous solution) was prepared.

(2) Formation of Coating Film

Tetraethoxysilane (TEOS) was added dropwise to the precursor-containing aqueous solution prepared in the section (1) so that a molar quantity of Si became 10 times that of Fe included in iron (III) nitrate nonahydrate used for the preparation of the precursor-containing aqueous solution of (1), and stirred for 24 hours.

Then, centrifugal separation was performed at a rotation rate of 7,000 rpm for 10 minutes by using a centrifugal separator and a precipitate was collected. The collected precipitate was dried in an oven at an internal atmosphere temperature of 80° C., and accordingly, a precursor of the particles of the epsilon type iron oxide-based compound was obtained. In the obtained particles, a Si-containing coating film generated by hydrolysis of TEOS is formed. It is assumed that this Si-containing coating film is a coating film of oxide or hydroxide of Si.

(3) Firing

A muffle furnace was filled with the powder obtained in the section (2), the firing was performed in the atmosphere by setting a temperature in the furnace as the condition in Table 1, thereby obtaining a fired product.

(4) Removal of Coating Film

The fired product obtained in the section (3) was put into a sodium hydroxide aqueous solution having a concentration of 4 mol/L (liter) and stirred at a liquid temperature of 60° C. for 24 hours, and the Si-containing coating film formed in the section (2) was removed. Then, centrifugal separation was performed at a rotation rate of 7,000 rpm for 10 minutes by using a centrifugal separator, and a precipitate was collected. The collected precipitate was dried in an oven at an internal atmosphere temperature of 80° C., and accordingly, particles of magnetic materials A to K which are epsilon type iron oxide-based compounds were obtained.

The epsilon type crystal structure of the particles of the magnetic materials A to K were confirmed by an X-ray diffraction (XRD) method. For a device, a diffractometer, X'Pert Pro manufactured by PANalytical was used.

In addition, the compositions of the magnetic materials A to K were confirmed by a high-frequency inductively coupled plasma (ICP) emission spectral analysis method. Specifically, a vessel containing 12 mg of particles of each magnetic material and 10 ml of a hydrochloric acid aqueous solution having a concentration of 4 mol/L was held on a hot plate at a set temperature of 80° C. for 3 hours, and a solution was obtained. Then, the obtained solution was filtered by using a membrane filter having a hole diameter of 0.1 μm. The element analysis of the filtrate obtained as described above was performed by using a high-frequency inductively coupled plasma (product name: ICP-8100, manufactured by Shimadzu Corporation) emission spectral analysis device. A content of each metal atom with respect to 100 atom % of iron atoms was obtained based on the result obtained from the element analysis. The results are as follows.

Magnetic material A: $\varepsilon\text{-}Ga_{(0\text{-}38)}Fe_{(1\text{-}62)}O_3$ Magnetic material B: $\varepsilon\text{-}Ga_{(0\text{-}39)}Fe_{(1\text{-}61)}O_3$ Magnetic material C: $\varepsilon\text{-}Ga_{(0\text{-}38)}Fe_{(1\text{-}62)}O_3$ Magnetic material D: $\varepsilon\text{-}Ga_{(0\text{-}39)}Fe_{(1\text{-}61)}O_3$ Magnetic material E: $\varepsilon\text{-}Ga_{(0\text{-}40)}Fe_{(1\text{-}60)}O_3$ Magnetic material F: $\varepsilon\text{-}Ga_{(0\text{-}39)}Fe_{(1\text{-}61)}O_3$ Magnetic material G: $\varepsilon\text{-}Ga_{(0\text{-}40)}Fe_{(1\text{-}60)}O_3$ Magnetic material H: $\varepsilon\text{-}Al_{(0\text{-}37)}Fe_{(1\text{-}63)}O_3$ Magnetic material I: $\varepsilon\text{-}In_{(0\text{-}35)}Fe_{(1\text{-}65)}O_3$ Magnetic material J: $\varepsilon\text{-}Ga_{(0\text{-}18)}Co_{(0\text{-}09)}Ti_{(0\text{-}09)}Fe_{(1\text{-}64)}O_3$ Magnetic material K: $\varepsilon\text{-}Fe_2O_3$ Shape of Particles The shape of the particles of the magnetic materials A to K were confirmed by observation performed with a transmission electron microscope (TEM), and all of the particles had a sphere shape.

Average Equivalent Circle Diameter of Particles

Average equivalent circle diameters of the particles of the magnetic materials A to K were obtained by the following method.

The particles were imaged at a magnification ratio of 60,000 by using a transmission electron microscope (TEM) (model number: H-9000 manufactured by Hitachi, Ltd.). The obtained TEM image of the particles was incorporated to image analysis software (model number: KS-400, manufactured by Carl Zeiss) and an image process was performed.

More specifically, the image analysis was performed regarding 500 particles randomly extracted from the TEM image in plural visual fields, and an equivalent circle diameter having the same area was calculated. By performing simple averaging (that is, number averaging) of the obtained equivalent circle diameter having the same area of the 500 particles, an average equivalent circle diameter of the particles was obtained. The results are shown in Table 1.

Manufacturing of Non-Epsilon Type Iron Oxide-Based Compound

As non-epsilon type iron oxide-based compounds, powders of a magnetic material L and a magnetic material M which are magnetic materials of barium ferrite having a hexagonal crystal structure shown below were manufactured.

Manufacturing of Magnetic Material L

Predetermined amounts of $H_3BO_3$ corresponding to $B_2O_3$, $Al(OH)_3$ corresponding to $Al_2O_3$, $BaCO_3$ corresponding to BaO, and $Fe_2O_3$ were weighed so that the contents in terms of oxide are set as $B_2O_3$: 23.0 mol %, $Al_2O_3$: 8.7 mol %, BaO: 37.0 mol %, and $Fe_2O_3$: 31.3 mol %, and the weighed materials were mixed with each other by using a mixer, thereby obtaining a mixture. The obtained mixture was put into a platinum crucible having volume of 2 L (liter), melted, and cooled by using a water cooling roll, and an amorphous material was obtained. 600 g of the obtained amorphous material was put into an electric furnace, heated to 720° C. at 4° C./min, and the temperature was held for 5 hours to crystallize (that is, deposition) hexagonal ferrite.

Then, 600 g of the heat-treated material subjected to the crystallization was coarsely crushed by using a mortar, thereby obtaining coarsely crushed material. The obtained coarsely crushed material, 5 kg of zirconia balls having a diameter of 5 mm, and 1.2 kg of pure water were put into 3 L (liter) of a pot mill, a crushing process was performed by using a ball mill for 4 hours, and the crushed solution was separated from the zirconia balls and put into 5 L (liter) of a stainless still beaker.

Then, the crushed solution and 30% by mass acetic acid solution were mixed with each other at a ratio (mass ratio) of 3:1, stirred in a state where the temperature was controlled to 85° C. for 2 hours, and subjected to acid treatment. A water washing operation by decantation was repeated with respect to the acid-treated material, the material was dried, thereby obtaining particles of the magnetic material L.

An average equivalent circle diameter of the obtained particles of the magnetic material L was measured by the same method as that used for the particles of the magnetic materials A to K, and the average equivalent circle diameter thereof was 22 nm.

Manufacturing of Magnetic Material M

Predetermined amounts of $H_3BO_3$ corresponding to $B_2O_3$, $Al(OH)_3$ corresponding to $Al_2O_3$, $BaCO_3$ corresponding to BaO, and $Fe_2O_3$ were weighed so that the contents in terms of oxide are set as $B_2O_3$: 22.8 mol %, $Al_2O_3$: 1.5 mol %, BaO: 31.7 mol %, and $Fe_2O_3$: 44.0 mol %, and the weighed materials were mixed with each other by using a mixer, thereby obtaining a mixture. The obtained mixture (a material in which some Fe was substituted with Zn=1.5 at % and Nb=0.75 at % was used) was put into a platinum crucible having volume of 2 L (liter), melted, and cooled by using a water cooling roll, and an amorphous material was obtained. 600 g of the obtained amorphous material was put into an electric furnace, heated to 660° C. at 4° C./min, and the temperature was held for 5 hours to crystallize (that is, deposition) hexagonal ferrite.

Then, 600 g of the heat-treated material subjected to the crystallization was coarsely crushed by using a mortar, thereby obtaining coarsely crushed material. The obtained coarsely crushed material, 5 kg of zirconia balls having a diameter of 5 mm, and 1.2 kg of pure water were put into 3 L (liter) of a pot mill, a crushing process was performed by using a ball mill for 4 hours, and the crushed solution was separated from the zirconia balls and put into 5 L (liter) of a stainless still beaker.

Then, the crushed solution and 30% by mass acetic acid solution were mixed with each other at a ratio (mass ratio) of 3:1, stirred in a state where the temperature was controlled to 85° C. for 2 hours, and subjected to acid treatment. A water washing operation by decantation was repeated with respect to the acid-treated material, the material was dried, thereby obtaining particles of the magnetic material M.

An average equivalent circle diameter of the obtained particles of the magnetic material M was measured by the same method as that used for the particles of the magnetic materials A to K, and the average equivalent circle diameter thereof was 19 nm.

TABLE 1

| | Concentration in raw material aqueous solution | | | | | | Firing conditions (firing temperature/ firing time) | Average equivalent circle diameter of ε type iron oxide-based compound (nm) |
|---|---|---|---|---|---|---|---|---|
| | | Salt of additive element M | | | | | | |
| | $Fe(NO_3)_3 \cdot 9H_2O$ | $Ga(NO_3)_3 \cdot 9H_2O$ | $Al(NO_3)_3 \cdot 9H_2O$ | $In(NO_3)_3 \cdot 3H_2O$ | $Co(NO_3)_2 \cdot 6H_2O$ | $Ti(SO_4)_2$ | | |
| Magnetic material A | 0.48 mol/L | 0.12 mol/L | — | — | — | — | 1050° C./4 hr | 12 |
| Magnetic material B | 0.48 mol/L | 0.12 mol/L | — | — | — | — | 1040° C./4 hr | 10 |
| Magnetic material C | 0.48 mol/L | 0.12 mol/L | — | — | — | — | 1020° C./4 hr | 8 |
| Magnetic material D | 0.48 mol/L | 0.12 mol/L | — | — | — | — | 1055° C./4 hr | 15 |
| Magnetic material E | 0.48 mol/L | 0.12 mol/L | — | — | — | — | 1065° C./4 hr | 17 |
| Magnetic material F | 0.48 mol/L | 0.12 mol/L | — | — | — | — | 980° C./4 hr | 6 |
| Magnetic material G | 0.48 mol/L | 0.12 mol/L | — | — | — | — | 1100° C./4 hr | 20 |
| Magnetic material H | 0.48 mol/L | — | 0.12 mol/L | — | — | — | 1050° C./4 hr | 12 |
| Magnetic material I | 0.48 mol/L | — | — | 0.12 mol/L | — | — | 1050° C./4 hr | 12 |
| Magnetic material J | 0.48 mol/L | 0.06 mol/L | — | — | 0.03 mol/L | 0.03 mol/L | 1050° C./4 hr | 12 |
| Magnetic material K | 0.60 mol/L | — | — | — | — | — | 1050° C./4 hr | 12 |

In Table 1, "-" shown in the column of the concentration in the raw material aqueous solution means that the corresponding component (that is, salt of additive element M) is not used.

Manufacturing of Magnetic Recording Medium (Magnetic Tape)

Examples 1 to 18 Comparative Examples 1 to 9

(1) Preparation of Alumina Dispersion

A dispersing agent which is the kind shown in Table 2 with the amount shown in Table 2, 31.3 parts by mass of a 32% by mass solution of polyester polyurethane including a $SO_3Na$ group as a polar group (product name: VYLON (registered trademark) UR-4800, amount of the $SO_3Na$ group: 80 meq/kg, solvent: mixed solution of methyl ethyl ketone and toluene (mass ratio: 50/50), manufactured by Toyobo Co., Ltd.), and 570.0 parts by mass of a mixed solution of methyl ethyl ketone and cyclohexanone (mass ratio: 50/50) as a solvent were added with respect to 100.0 parts by mass of alumina powder (product name: HIT-80, average particle diameter: 130 nm, a transformation rate: approximately 65%, BET specific surface area: 20 m$^2$/g, manufactured by Sumitomo Chemical Co., Ltd.), and dispersion treatment was performed in the presence of zirconia beads by a paint shaker for a period of time shown in Table 2. A dispersion temperature was adjusted to a temperature shown in Table 2 by installing an external jacket capable of adjusting a temperature with respect to a dispersion container.

After the dispersion treatment, the zirconia beads were separated and removed from the dispersion-treated material by a mesh and an alumina dispersion was obtained.

(2) Preparation of Magnetic Layer Forming Composition

A magnetic layer forming composition having the composition shown below was prepared by the following method.

First, magnetic liquid having the composition shown below was prepared. Each component of the magnetic liquid was beads-dispersed by a batch type vertical sand mill for 24 hours and magnetic liquid was prepared. As dispersion beads, zirconia beads having a particle diameter of 0.1 mm were used.

Then, the magnetic liquid prepared as described above, the alumina dispersion (that is, abrasive solution), and other components shown below (silica sol, other components, and the finishing additive solvent) were stirred at a circumferential speed of 10 m/sec by using a dissolver stirrer for 30 minutes.

Then, the dispersion treatment was performed twice with a flow type ultrasonic disperser at a flow rate of 7.5 kg/min, filtering was performed once by using a filter having an average hole diameter of 0.1 μm, thereby obtaining a magnetic layer forming composition.

Composition of Magnetic Layer Forming Composition

Magnetic Liquid

Magnetic material shown in Table 2: 100.0 parts by mass
(Magnetic material A to magnetic material M manufactured as described above)

Polyurethane A: 10.0% by mass
($SO_3Na$ group-containing polyurethane, $SO_3Na$ group amount: $6 \times 10^{-5}$ eq/g, weight-average molecular weight: 100,000, Tg: 65° C., synthesis composition: hydrogenated bisphenol/polypropylene oxide adduct of bisphenol A/sulfoisophthalic acid ethylene oxide adduct/diphenylmethane isocyanate/trimethylolpropane (molar ratio: 0.6/0.3/0.05/1.0/0.05); binding agent)

Cyclohexanone: 150.0 parts
Methyl ethyl ketone: 150.0 parts by mass

Abrasive Solution

Alumina dispersion prepared in the section (1): 6.0 parts by mass

Silica Sol
Colloidal silica (average particle diameter: 80 nm): 2.0 parts by mass
Methyl ethyl ketone: 1.4 parts by mass
Other Components
Butyl stearate (lubricant): 1.0 parts by mass
Stearic acid (lubricant): 1.0 part by mass
Polyisocyanate (curing agent): 2.5 parts by mass
    (Product name: CORONATE (registered trademark) L, manufactured by Tosoh Corporation)
Finishing Additive Solvent
Cyclohexanone: 200.0 parts by mass
Methyl ethyl ketone: 200.0 parts by mass (3) Preparation of Non-Magnetic Layer Forming Composition A non-magnetic layer forming composition having the composition shown below was prepared by the following method.

Among components of the non-magnetic layer forming composition shown below, the components excluding butyl stearate and stearic acid which are lubricants, cyclohexanone, and methyl ethyl ketone were beads-dispersed by using a batch type vertical sand mill for 24 hours, thereby obtaining first dispersion liquid. As dispersion beads, zirconia beads having a particle diameter of 0.1 mm were used.

Then, the remaining components (that is, butyl stearate and stearic acid which are lubricants, cyclohexanone, and methyl ethyl ketone) were added to the obtained first dispersion liquid and stirred at a circumferential speed of 10 m/sec by using a dissolver stirrer for 60 minutes, thereby obtaining second dispersion liquid.

Next, the obtained second dispersion liquid was filtered by using a filter having an average hole diameter of 0.5 μm, and a non-magnetic layer forming composition was obtained.

Composition of Non-Magnetic Layer Forming Composition
Non-magnetic inorganic particles; α-iron oxide: 100.0 parts by mass
    (Average particle diameter (average long axis length): 0.15 μm, Average acicular ratio: 7, BET specific surface area: 52 $m^2/g$)
Carbon black: 20.0 parts by mass
    (Average particle diameter: 20 nm)
An electron beam-curable vinyl chloride copolymer: 13.0 parts by mass
    (Material obtained by acryl modification of MR110 (average degree of polymerization: 310, epoxy content: 3% by mass) manufactured by Zeon Corporation which is a vinyl chloride-epoxy-containing monomer copolymer by using 2-isocyanate ethyl methacrylate (acryl content: 6 mol/1 mol))
An electron beam-curable polyurethane resin: 6.0 parts by mass
    (Hydroxyl-containing acryl compound-phosphonic acid-containing phosphorus compound-hydroxy-containing polyester polyol, weight-average molecular weight: 23,000, P content: 0.2% by mass, acryl content: 8 mol/1 mol)
Butyl stearate (lubricant): 4.0 parts by mass
Stearic acid (lubricant): 1.0 part by mass
Phenylphosphonic acid: 3.0 parts by mass
Cyclohexanone: 300.0 parts by mass
Methyl ethyl ketone: 300.0 parts by mass (4) Preparation of Back Coating Layer Forming Composition A back coating layer forming composition having the composition shown below was prepared by the following method.

Among components of the back coating layer forming composition shown below, the components excluding butyl stearate and stearic acid which are lubricants, polyisocyanate which is a curing agent, cyclohexanone, and methyl ethyl ketone were kneaded by an open kneader and diluted (diluent solvent: mixed solvent of methyl ethyl ketone and cyclohexanone), and was subjected to a dispersion process of 12 passes, with a transverse beads mill disperser and zirconia beads having a diameter of 1 mm, by setting a bead filling percentage as 80 volume %, a circumferential speed of rotor distal end as 10 m/sec, and a retention time for 1 pass as 2 minutes.

After that, the remaining components (that is, butyl stearate and stearic acid which are lubricants, polyisocyanate which is a curing agent, cyclohexanone, and methyl ethyl ketone) were added into the obtained first dispersion liquid, and stirred a circumferential speed of 10 m/sec by using a dissolver stirrer for 60 minutes, thereby obtaining second dispersion liquid.

Next, the obtained second dispersion liquid was filtered by using a filter having an average hole diameter of 1.0 μm, and a back coating layer forming composition was obtained.

Composition of Back Coating Layer Forming Composition
Non-magnetic inorganic particles; α-iron oxide: 80 parts by mass
    (Average particle diameter (average long axis length): 0.15 μm, Average acicular ratio: 7, BET specific surface area: 52 $m^2/g$)
Carbon black: 20.0 parts by mass
    (Average particle diameter: 20 nm)
A vinyl chloride copolymer: 13.0 parts by mass
    (Product name: MR-104, manufactured by Zeon Corporation)
$SO_3Na$ group-containing polyurethane: 6.0 parts by mass
    (Weight-average molecular weight: 50,000, $SO_3Na$ group amount: 0.07 meq/g)
Butyl stearate (lubricant): 3.0 parts by mass
Stearic acid (lubricant): 3.0 part by mass
Phenylphosphonic acid: 3.0 parts by mass
Polyisocyanate (curing agent): 5.0 parts by mass
    (Product name: CORONATE (registered trademark) 3041, manufactured by Tosoh Corporation)
Cyclohexanone: 355.0 parts by mass
Methyl ethyl ketone: 155.0 parts by mass (5) Manufacturing of Magnetic Tape The non-magnetic layer forming composition was applied onto a polyethylene naphthalate support (that is, non-magnetic support) having a thickness of 5.00 μm so that the thickness after drying becomes 1.00 μm, and dried, an electron beam was emitted with an energy of 40 kGy at an acceleration voltage of 125 kV, and a non-magnetic layer was formed.

Then, the magnetic layer forming composition was applied onto the formed non-magnetic layer so that the thickness after drying becomes 60 nm (0.06 μm) to form a coating layer. A smoothing process was performed with respect to the coating layer while the formed coating layer is wet. The smoothing process was performed by applying shear to the coating layer using a commercially available solid smoother (center line average surface roughness (catalogue value): 1.2 nm).

After that, a homeotropic alignment process was performed in an alignment zone by applying a magnetic field having magnetic field strength of 0.3 T in a vertical direction to the surface of the coating layer, the coating layer was dried, and a magnetic layer was formed. A temperature of a drying zone was set to 100° C.

Then, the back coating layer forming composition was applied onto the surface of the non-magnetic support on a side opposite to the surface where the non-magnetic layer and the magnetic layer are formed so that the thickness after drying becomes thickness of 0.40 μm, and dried to form a back coating layer, and a laminate having a layer configuration of back coating layer/non-magnetic support/non-magnetic layer/magnetic layer was obtained.

Next, the surface smoothing treatment (so-called calender process) was performed with respect to the obtained laminate with a calender roll configured of only a metal roll, at a calender process speed of 80 m/min, linear pressure of 300 kg/cm (294 kN/m), and a surface temperature of a calender roll of 90° C., and heat treatment was performed in an environment of an atmosphere temperature of 70° C. for 36 hours. After the heat treatment, the laminate was slit to have a width of ½ inches (0.0127 meters), and a slit product was obtained.

Then, regarding the obtained slit product, the surface of the magnetic layer was cleaned with a tape cleaning device in which a nonwoven fabric and a razor blade are attached to a device having a function of sending and winding the slit product so as to press the surface of the magnetic layer.

By doing so, magnetic tapes of Examples 1 to 18 and Comparative Examples 1 to 9 were manufactured.

Comparative Example 10

A magnetic tape of Comparative Example 10 was manufactured by performing the same operation as in Example 1, except that an alumina dispersion is not prepared in advance, materials used for preparing an alumina dispersion, colloidal silica (average particle diameter: 80 nm), and methyl ethyl ketone were added to a batch type vertical sand mill used for dispersing the magnetic material, and the dispersion of the magnetic material and the dispersion of alumina were performed at the same time.

The mixed amount of each component was adjusted so that the composition of the abrasive solution included in the magnetic layer forming composition becomes the composition of the abrasive solution described above.

Measurement and Evaluation

The following measurement and evaluation were performed with respect to magnetic tapes of Examples 1 to 18 and Comparative Examples 1 to 10 manufactured as described above. The evaluation result is shown in Table 2.

(1) Measurement of Plan View Average Equivalent Circle Diameter and Calculation of Coefficient of Variation of Equivalent Circle Diameter of Abrasive An average equivalent circle diameter of the abrasive in a plan view of the magnetic layer (so-called plan view average equivalent circle diameter) was measured as an index of a presence state of the abrasive in the magnetic layer of the magnetic tape. The plan view average equivalent circle diameter of the abrasive was obtained from an image (so-called SEM image) of the abrasive imaged by using a field emission-scanning electron microscope (FE-SEM). Specific procedure is shown below.

1. Acquisition of SEM Image

A two-dimensional electron image was acquired by using a FE-SEM S4800 manufactured by Hitachi, Ltd. as a field emission-scanning electron microscope, by setting a probe current as Normal under the conditions of an accelerating voltage of 5 kV, a working direction (W.D.) of 8 mm and an imaging magnification of 20,000, without performing a coating process before the imaging.

2. Image Analysis The image analysis was performed by the following procedure using WinRoof manufactured by Mitani Corporation as image analysis software. An area is acquired as a pixel (unit).

(1) Image data (SEM (20 K) jpg image) of an SEM image acquired in the section of "1. Acquiring SEM Image" was dragged and dropped to WinROOF.

(2) Then, an area of the image having a vertical length of 4.3 μm and a horizontal length of 6.3 μm, excluding a part where a magnification and scale are displayed, was selected as an analysis region. (3) Next, a binary coded process of the analysis region was performed. Specifically, 150 gradation is selected as a lower limit value and 255 gradation was selected as an upper limit value, and a binary coded process with these two threshold values was performed. By performing the binary coded process, an area of each white shining part on the analysis region was obtained. As the operation of the image analysis software, "measurement→shape properties→area" was executed.

(4) A size (so-called equivalent circle diameter) having a size of a circle having the same area as that of each part was obtained by the following Formula (A).

(5) The equivalent circle diameters of 500 abrasives were acquired, and an average value that is, average equivalent circle diameter) and a coefficient of variation were calculated.

$$\text{Equivalent circle diameter} = \sqrt{4 \times \text{Areaofeachportion}/\pi} \qquad (A)$$

(2) Evaluation of (Signal to Noise Ratio (SNR)

A magnetic signal was recorded on a magnetic tape in a longitudinal direction of the magnetic tape and recorded by a magnetoresistive (MR) head under the following recording and reproducing conditions. The magnetic signal was frequency-analyzed by using a spectrum analyzer manufactured by Shibasoku Co., Ltd. and a ratio of output of 300 kfci and noise accumulated in a range of 0 kfci to 600 kfci was set as an SNR. The unit "kfci" is a unit of linear recording density.

Recording and Reproducing Conditions
Recording
Recording track width: 5 μm
Recording gap: 0.17 urn
Saturated magnetic flux density (Bs) of head: 1.8 T
Reproducing
Reproducing track width: 0.4 μm
Distance between shields (sh) (sh-sh distance): 0.08 μm
Recording wavelength: 300 kfci (3) Evaluation Scratch Resistance of Magnetic Layer A load of 20 g using an alumina sphere having a diameter of 4 mm was applied to the surface of the magnetic tape (that is, surface of the magnetic layer) in an environment of an atmosphere temperature of 23° C. and 10% RH, and the magnetic tape was allowed to repeatedly run 20 times. After the running, the portion of the surface of the magnetic layer where the load was applied was observed with an optical microscope (magnification: 200) and scratch resistance of the magnetic layer was evaluated based on the following evaluation standard.

In a case where the evaluation result showed "A", "B", or "C", it was determined that the scratch resistance was in the practically accepted range.

Evaluation Standard

A: The number of scratches on the surface of the magnetic layer confirmed in a view field of an optical microscope is 0.

B: The number of scratches on the surface of the magnetic layer confirmed in a view field of an optical microscope is 1 to 5.

C: The number of scratches on the surface of the magnetic layer confirmed in a view field of an optical microscope is 6 to 10.

D: The number of scratches on the surface of the magnetic layer confirmed in a view field of an optical microscope is 11 to 50.

E: The number of scratches on the surface of the magnetic layer confirmed in a view field of an optical microscope is greater than 51.

TABLE 2

| | | Dispersion conditions of abrasive | | | | Presence state of abrasive | | Evaluation | |
| | | | | | | Plan view average equivalent circle diameter (nm) | Coefficient of variation of plan view equivalent circle diameter (%) | | |
| | Magnetic material | Dispersion time | Kind of dispersing agent | Amount of dispersing agent (parts by mass) | Dispersion temperature | | | SNR (dB) | Scratch resistance |
| --- | --- | --- | --- | --- | --- | --- | --- | --- | --- |
| Example 1 | Magnetic material A | 5 hr | Oleic acid | 3 | 20° C. | 120 | 51 | +1.8 | A |
| Example 2 | Magnetic material B | 5 hr | Oleic acid | 3 | 20° C. | 130 | 53 | +2.0 | A |
| Example 3 | Magnetic material C | 5 hr | Oleic acid | 3 | 20° C. | 140 | 54 | +2.2 | A |
| Example 4 | Magnetic material D | 5 hr | Oleic acid | 3 | 20° C. | 110 | 49 | +1.7 | A |
| Example 5 | Magnetic material E | 5 hr | Oleic acid | 3 | 20° C. | 110 | 48 | +1.5 | A |
| Comparative Example 1 | Magnetic material F | 5 hr | Oleic acid | 3 | 20° C. | 140 | 55 | +0.2 | A |
| Comparative Example 2 | Magnetic material G | 5 hr | Oleic acid | 3 | 20° C. | 100 | 45 | +0.4 | A |
| Example 6 | Magnetic material H | 5 hr | Oleic acid | 3 | 20° C. | 150 | 48 | +2.0 | A |
| Example 7 | Magnetic material I | 5 hr | Oleic acid | 3 | 20° C. | 180 | 48 | +1.9 | A |
| Example 8 | Magnetic material J | 5 hr | Oleic acid | 3 | 20° C. | 170 | 48 | +2.3 | A |
| Example 9 | Magnetic material K | 5 hr | Oleic acid | 3 | 20° C. | 120 | 50 | +1.0 | A |
| Example 10 | Magnetic material A | 10 hr | Oleic acid | 3 | 20° C. | 200 | 42 | +2.0 | A |
| Example 11 | Magnetic material A | 15 hr | Oleic acid | 3 | 20° C. | 60 | 50 | +2.2 | A |
| Comparative Example 3 | Magnetic material A | 20 hr | Oleic acid | 3 | 20° C. | 18 | 40 | +0.1 | A |
| Example 12 | Magnetic material A | 3 hr | Oleic acid | 3 | 20° C. | 500 | 50 | +1.5 | B |
| Comparative Example 4 | Magnetic material A | 1 hr | Oleic acid | 3 | 20° C. | 1300 | 62 | +0.2 | E |
| Example 13 | Magnetic material A | 5 hr | 2,3-dihydroxy-naphthalene | 3 | 20° C. | 110 | 39 | +2.8 | A |
| Comparative Example 5 | Magnetic material A | 5 hr | Stearic acid | 3 | 20° C. | 200 | 65 | +2.5 | D |
| Example 14 | Magnetic material A | 5 hr | Oleic acid | 3 | 15° C. | 310 | 53 | +1.7 | A |
| Example 15 | Magnetic material A | 5 hr | Oleic acid | 3 | 40° C. | 90 | 45 | +2.0 | C |
| Comparative Example 6 | Magnetic material A | 5 hr | Oleic acid | 3 | 80° C. | 2000 | 42 | +0.3 | E |
| Example 16 | Magnetic material A | 5 hr | Oleic acid | 1 | 20° C. | 800 | 56 | +1.9 | B |
| Example 17 | Magnetic material A | 5 hr | Oleic acid | 5 | 20° C. | 70 | 49 | +1.7 | A |
| Example 18 | Magnetic material A | 5 hr | Oleic acid | 10 | 20° C. | 45 | 41 | +1.5 | A |
| Comparative Example 7 | Magnetic material L | 5 hr | Oleic acid | 3 | 20° C. | 180 | 54 | ±0.0 | B |
| Comparative Example 8 | Magnetic material M | 5 hr | Oleic acid | 3 | 20° C. | 210 | 55 | +0.5 | B |
| Comparative Example 9 | Magnetic material A | 5 hr | 2,3-dihydroxy-naphthalene | 10 | 80° C. | 100 | 28 | +1.3 | E |
| Comparative Example 10 | Magnetic material A | 5 hr | Oleic acid | 3 | 20° C. | 25000 | 75 | −0.1 | E |

As shown in Table 2, each magnetic tape of Examples 1 to 18, including: a non-magnetic support, and a magnetic layer including particles of an epsilon type iron oxide-based compound, an abrasive, and a binding agent, at least on one surface of the non-magnetic support, in which an average equivalent circle diameter of the particles of the epsilon type iron oxide-based compound is 7 nm to 18 nm, an average equivalent circle diameter of the abrasive in a plan view of the magnetic layer is 20 nm to 1,000 nm, and a coefficient of variation of the equivalent circle diameter of the abrasive is 30% to 60%, showed an excellent SNR and included the magnetic layer excellent scratch resistance.

On the other hand, in the magnetic tape of Comparative Example 1 in which the average equivalent circle diameter of the particles of the epsilon type iron oxide-based compound is smaller than 7 nm and a magnetic tape of Comparative Example 2 in which the average equivalent circle diameter thereof exceeds 18 nm, a significantly low value of the SNR was shown, compared to the magnetic tapes in which the average equivalent circle diameter thereof is 7 nm to 18 nm (for example, Examples 1 to 5).

In the magnetic tape of Comparative Example 3 in which the average equivalent circle diameter of the abrasive in a plan view of the magnetic layer is smaller than 20 nm, a significantly low value of the SNR was shown, compared to the magnetic tape in which the average equivalent circle diameter thereof is 20 nm to 1,000 nm (for example, Example 1).

In the magnetic tapes of Comparative Examples 4 and 10 in which the average equivalent circle diameter of the abrasive in a plan view of the magnetic layer exceeds 1,000 nm, and the coefficient of variation of the equivalent circle diameter of the abrasive is greater than 60%, a significantly low value of the SNR was shown and scratch resistance was significantly deteriorated, compared to the magnetic tape in which the average equivalent circle diameter of the abrasive is 20 nm to 1,000 nm and the coefficient of variation of the equivalent circle diameter of the abrasive is 30% to 60% (for example, Example 1).

In the magnetic tape of Comparative Example 9 in which the coefficient of variation of the equivalent circle diameter of the abrasive in a plan view of the magnetic layer is smaller than 30%, scratch resistance was significantly deteriorated, compared to the magnetic tape in which the coefficient of variation thereof is 30% to 60% (for example, Example 1).

In the magnetic tape of Comparative Example 5 in which the coefficient of variation of the equivalent circle diameter of the abrasive in a plan view of the magnetic layer is greater than 60%, scratch resistance was significantly deteriorated, compared to the magnetic tape in which the coefficient of variation thereof is 30% to 60% (for example, Example 1).

In the magnetic tape of Comparative Example 6 the average equivalent circle diameter of the abrasive in a plan view of the magnetic layer exceeds 1,000 nm, a significantly low value of the SNR was shown and scratch resistance was significantly deteriorated, compared to the magnetic tape in which the average equivalent circle diameter of the abrasive is 20 nm to 1,000 nm (for example, Example 1).

In the magnetic tapes of Comparative Examples 7 and 8 in which particles of barium ferrite having a hexagonal crystal structure which is a non-epsilon type iron oxide were used as a magnetic material, a significantly low value of the SNR was shown, regardless of the presence state of the abrasive, compared to the magnetic tape in which the particles of epsilon type iron oxide-based compound were used (for example, Example 1).

What is claimed is:

1. A magnetic recording medium comprising:
a non-magnetic support; and
a magnetic layer including particles of at least one kind of epsilon type iron oxide-based compound selected from the group consisting of $\varepsilon\text{-}Fe_2O_3$ and a compound represented by Formula (1), an abrasive, and a binding agent, at least on one surface of the non-magnetic support,
wherein an average equivalent circle diameter of the particles of the epsilon type iron oxide-based compound is 7 nm to 18 nm,
an average equivalent circle diameter of the abrasive is 20 nm to 1,000 nm, and
a coefficient of variation of the equivalent circle diameter of the abrasive is 30% to 60%, in a plan view of an area of a surface of the magnetic layer having a vertical length of 4.3 µm and a horizontal length of 6.3 µm, observed using a scanning electron microscope (SEM):

$$\varepsilon\text{-}A_aFe_{2-a}O_3 \qquad (1)$$

in Formula (1), A represents at least one kind of metal element other than Fe and a satisfies a relationship of 0<a<2.

2. The magnetic recording medium according to claim 1, wherein the epsilon type iron oxide-based compound includes the compound represented by Formula (1), and
A in Formula (1) is at least one kind of metal element selected from the group consisting of Ga, Al, In, Co, Zn, Ti, and Nb.

3. The magnetic recording medium according to claim 1, wherein the average equivalent circle diameter of the abrasive in a plan view of the magnetic layer is 30 nm to 800 nm.

4. The magnetic recording medium according to claim 3, wherein the average equivalent circle diameter of the abrasive in a plan view of the magnetic layer is 110 nm to 200 nm.

5. The magnetic recording medium according to claim 1, wherein a recording system is a linear recording system.

6. The magnetic recording medium according to claim 1, which is used in electromagnetic wave assist recording.

* * * * *